United States Patent
Nilssen

[19]

[11] Patent Number: 5,999,094
[45] Date of Patent: Dec. 7, 1999

[54] COMBINATION TELEPHONE AND SMOKE ALARM SYSTEM

[76] Inventor: Ole K. Nilssen, Caesar Dr., Barrington, Ill. 60010

[21] Appl. No.: 08/166,931

[22] Filed: Dec. 15, 1993

Related U.S. Application Data

[63] Continuation-in-part of application No. 08/004,598, Jan. 14, 1993, which is a continuation-in-part of application No. 07/860,234, Mar. 27, 1992, Pat. No. 5,210,788, which is a continuation of application No. 07/627,189, Dec. 13, 1990, abandoned, which is a continuation-in-part of application No. 07/562,897, Aug. 6, 1990, Pat. No. 5,068,890, which is a continuation-in-part of application No. 07/397,266, Aug. 23, 1989, Pat. No. 5,070,522, which is a continuation-in-part of application No. 07/136,505, Dec. 23, 1987, Pat. No. 4,866,757, which is a continuation of application No. 06/921,381, Oct. 22, 1986, abandoned.

[51] Int. Cl.$^6$ ..................................................... G08B 29/00
[52] U.S. Cl. .......................... 340/507; 340/510; 340/533; 340/538; 340/628; 379/37
[58] Field of Search ..................................... 340/507, 538, 340/510, 511, 533, 628; 379/413, 37, 38, 42–44

[56] References Cited

U.S. PATENT DOCUMENTS

| | | | |
|---|---|---|---|
| 3,925,763 | 12/1975 | Wadhwani et al. | 340/538 |
| 4,429,299 | 1/1984 | Kabat et al. | 340/538 |
| 4,468,655 | 8/1984 | Iwata | 340/505 |
| 4,673,920 | 6/1987 | Ferguson et al. | 340/506 |
| 4,731,810 | 3/1988 | Watkins | 340/538 |
| 4,812,820 | 3/1989 | Chatwin | 340/531 |
| 4,951,029 | 8/1990 | Severson | 340/533 |
| 5,237,305 | 8/1993 | Ishikuro et al. | 340/310 R |

*Primary Examiner*—Donnie L. Crosland

[57] ABSTRACT

An in-building telephone distribution system has a multi-conductor telephone distribution cable, starting at the point where the telephone utility lines enter the building and extending from there to each location at which a telephone outlet is wanted, at which a smoke alarm is wanted, and/or at which one of numerous other devices (e.g., door chime) might be wanted. At a suitable point along the cable, a first pair of the cable's conductors is connected with the power output terminals of a Class-2 (or Class-2-equivalent) DC power supply, whose power input terminals are connected with an ordinary electric utility power line. Thus, at any point along the cable, the first pair of conductors may be accessed and used as a Class-2 DC power source. A second pair of the cable's distribution conductors is used for distribution of the telephone signals. Each telephone outlet is connected with the second pair of conductors for telephone signals and with the first pair of conductors for Class-2 DC power; which Class-2 DC power is used for powering those telephone instruments requiring DC power, such as cord-less telephones, telephone answering machines, fax machines, modems, etc. A third pair of conductors is used for smoke alarm signals and is therefore connected with each smoke alarm; each of which is also connected with the first pair of conductors so as to have access to Class-2 DC power.

30 Claims, 17 Drawing Sheets

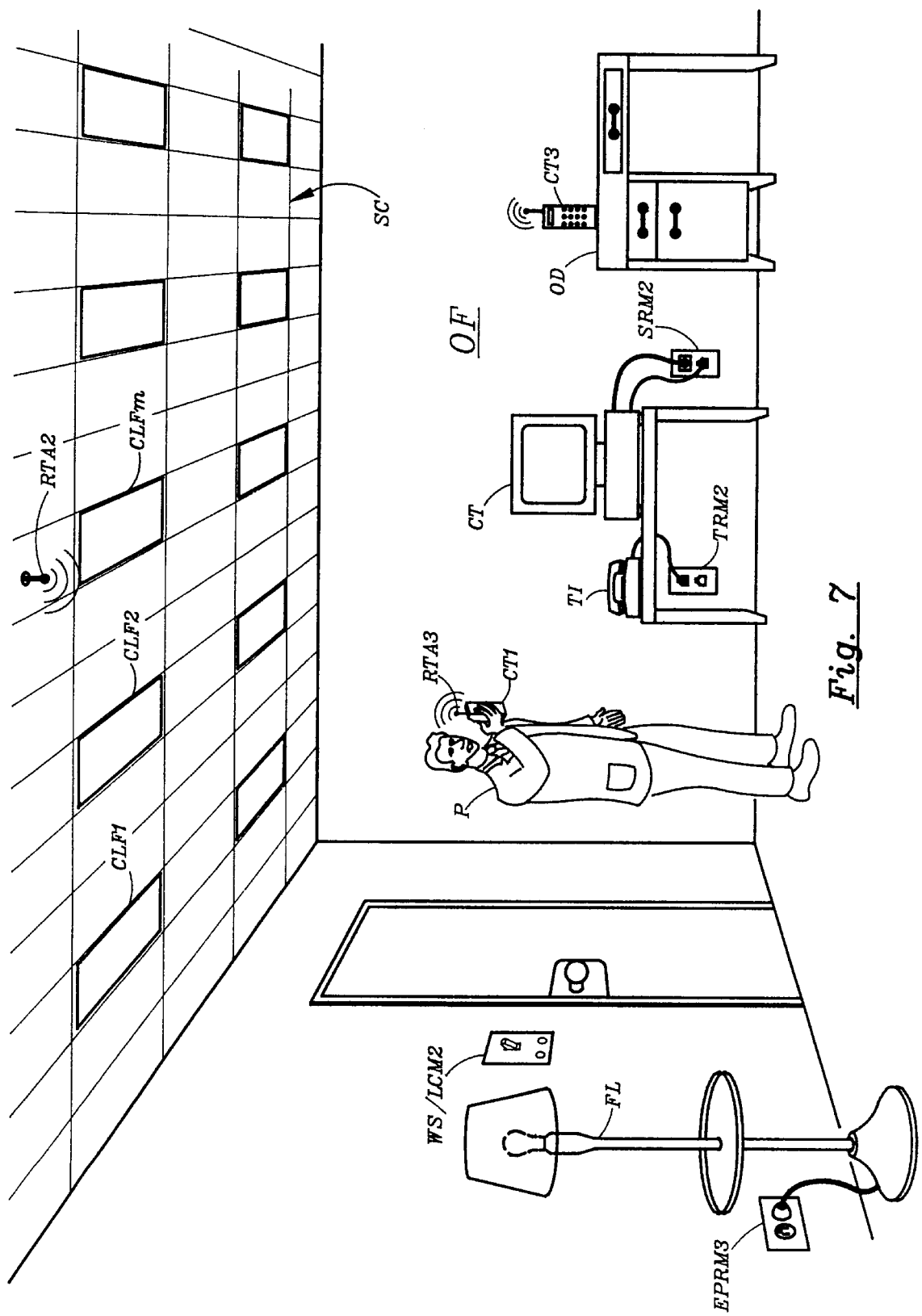

1

COMBINATION TELEPHONE AND SMOKE ALARM SYSTEM

RELATED APPLICATIONS

This application is a Continuation-in-Part of Ser. No. 08/004,598 filed Jan. 14, 1993; which is a Continuation-in-Part of Ser. No. 07/860,234 filed Mar. 27, 1992, now U.S. Pat. No. 5,210,788; which is a Continuation of Ser. No. 07/627,189 filed Dec. 13, 1990, abandoned; which is a Continuation-in-Part of Ser. No. 07/562,897 filed Aug. 6, 1990, now U.S. Pat. No. 5,068,890; which is a Continuation-in-Part of Ser. No. 07/397,266 filed Aug. 23, 1989, now U.S. Pat. No. 5,070,522; which is a Continuation-in-Part of application Ser. No. 07/136,505 filed Dec. 23, 1987, now U.S. Pat. No. 4,866,757; which is a Continuation of Ser. No. 06/921,381 filed Oct. 22, 1986, now abandoned.

BACKGROUND OF THE INVENTION

Field of the Invention

The present invention relates to in-building combined telephone, smoke alarm and Class-2 power distribution systems.

SUMMARY OF THE INVENTION

Object of the Invention

A main object of the present invention is an in-building combination telephone, smoke alarm and Class-2 power distribution system.

This as well as other objects, features and advantages of the present invention will become apparent from the following description and claims.

Brief Description of the Invention

An in-building telephone distribution system has a multi-conductor telephone distribution cable, starting at the point where the telephone utility lines enter the building and extending from there to each location at which a telephone outlet is wanted, at which a smoke alarm is wanted, and/or at which one of numerous other devices (e.g., door chime) might be wanted.

At a suitable point along the cable, a first pair of the cable's conductors is connected with the power output terminals of a Class-2 (or Class-2-equivalent) DC power supply, whose power input terminals are connected with an ordinary electric utility power line. Thus, at any point along the cable, the first pair of conductors may be accessed and used as a Class-2 DC power source.

A second pair of the cable's distribution conductors is used for distribution of the telephone signals. Each telephone outlet is connected with the second pair of conductors for telephone signals and with the first pair of conductors for Class-2 DC power; which Class-2 DC power is used for powering those telephone instruments requiring DC power, such as cord-less telephones, telephone answering machines, fax machines, modems, etc.

A third pair of conductors is used for smoke alarm signals and is therefore connected with each smoke alarm; each of which is also connected with the first pair of conductors so as to have access to Class-2 DC power.

Additional conductors are used for various related and/or incidental purposes, such as supplying Class-2 power from a second Class-2 power source.

Brief Description of a Related System

A special cordless telephone instrument has a cordless hand-piece and one or more dedicated base-stations. Each such base-station is hard-wire-connected with the ordinary telephone utility system and preferably includes a cellular telephone.

The cordless hand-piece, which is powered by a built-in rechargeable battery, is—within its maximum cordless operating range (e.g., up to perhaps as high as 1000 feet)—connected with its nearest base-station via two-way radio transmission.

When not in use, the hand-piece is—at least at times—resting in a cradle or receptacle at its nearest base-station, thereby automatically getting its battery recharged.

When in use, the hand-piece is removed from its cradle; and, when so removed, the hand-piece may—while located within the cordless operating range of one of its base-stations—be used for receiving and/or placing phone-calls via that base-station.

When located outside of the cord-less operating range of one of its base-stations, the hand-piece automatically converts to a hand-held cellular telephone instrument; which may then be used for receiving and/or placing telephone calls in any location served by an ordinary cellular telephone system.

Thus, a person may have a dedicated base-station in his office whereat his cordless hand-piece is cradled most of the time during his office hours, thereby keeping him tele-connected via his office telephone instrument and lines while maintaining the battery built into the hand-piece fully charged. When he leaves his office, he would bring his hand-piece along; which, after being taken outside of its cordless range with respect to his in-office base station, will automatically convert itself into a cellular telephone instrument; which will then keep him tele-connected while he is on his way home. That is, when leaving the cordless range, the system will automatically convert to a cellular mode, even in the middle of a conversation. When he gets home, he may place his hand-piece into the cradle of another dedicated base-station. In any case, his hand-piece will in effect automatically convert itself back to a regular cordless telephone mode as soon as it comes within the cordless range of his in-home base-station.

Brief Description of a Second Related System

In a building's system for distributing telephone and other information-carrying signals to various signal utilization means, as well as electric power to various electric power utilization means, such telephone and other information-carrying signals are distributed along with electric power in a common distribution system wherein a signal conduction means (such as ordinary telephone wires, coaxial cable and/or optical fibers) and electric power conduction means are routed alongside each other to/from various end points at which electric power is being utilized, such as to/from electric lighting fixtures, wall switches, power receptacles, etc. At some of these end points, telephone and/or other information signal receptacles are provided alongside electric power receptacles. At others of these end points, the signal conduction means is connected with a radio transceiver and/or wireless signal radiating/receiving means, such as a small two-way radio antenna mounted at or near a ceiling lighting fixture; which radio antenna would interact in two-way manner with a two-way antenna and/or transceiver means combined with a telephone and/or some other information-handling instrument located nearby.

In addition to being used for transmitting telephone and/or other information-carrying signals, the signal conduction means is used for controlling the flow and/or usage of electric power, such as to control the output of light from each individual lighting fixtures, to provide for distributed protection against electrical circuit overload and/or for prevention of fire initiation hazards, such as is presently attained by routing electric power conductors within steel conduits or armor.

One of the telephone instruments connected with the common distribution system has a feature whereby the mere lifting of the receiver causes either a pre-programmed telephone number (or prefix) to be automatically dialed, but only after a brief delay; which brief delay provides for an opportunity to initiate dialing of some other telephone number before the dialing of the pre-programmed telephone number is actually executed.

In its ultimately preferred embodiment, the combination signal and power distribution system incorporates a special PBX (i.e., Private Branch Exchange) system so adapted as to make a given wireless telephone instrument operative automatically to access, and/or to be accessed from, the signal distribution part of the system by way of a small two-way antenna projecting into a room (as from one of the ceiling lighting fixtures) within which the given wireless telephone instrument is located. Thus, a person carrying this wireless telephone instrument will be able, automatically, to place and/or receive telephone calls wherever he might happen to be within a building (or within a system of buildings) wherein each room has a wireless connection or access point (such as via a small antenna on a ceiling lighting fixture) to the signal distribution part of the combined signal and power distribution system.

In its more immediately preferred embodiment, the related invention may be compactly described as follows.

In a building, such as an office building, a power and signal distribution system comprising:

(a) a central location whereat: (i) at a signal terminal means, wireless and/or hard-wire connections are made with some external communications facility, such as a local telephone company; (ii) at a main power terminal means, connection is made with, and unconditioned electric power is received from, the local electric utility company; and (iii) at an auxiliary power terminal means, connection is made with and conditioned electric power is received from an auxiliary source of electric power, which auxiliary source of electric power may advantageously include a storage battery means;

(b) main power conduction means, such as a set of relatively heavy-gauge electric conductors, connected with the main power terminal means; the main power conduction means being routed, at least in part, along a path to a set of main power utilization points within or near the building;

(c) auxiliary power conduction means, such as a set of relatively light-gauge electric conductors, connected with the auxiliary power terminal means; the auxiliary power conduction means being routed, at least in part, alongside the main power conduction means to a set of auxiliary power utilization points within or near the building;

(d) signal conduction means, such as an optical fibre means, connected with the signal terminal means; the signal conduction means being routed alongside the main power conduction means and/or alongside the auxiliary power conduction means to a set of signal utilization points within or near the building;

(e) a main power utilization means, such as an electric lighting fixture, connected with the main power conduction means at a first of said main utilization points and operative to be powered by unconditioned power provided therefrom;

(f) an auxiliary power utilization means, such as a telephone instrument having a feature whereby the mere lifting of its receiver causes the automatic dialing of a pre-programmed telephone number, connected with the auxiliary power conduction means at a first of said auxiliary utilization points and operative to be powered by conditioned power received therefrom;

(g) a first signal utilization means, such as a computer terminal and/or a telephone instrument, connected with the signal conduction means at a first of said signal utilization points and operative thereby to communicate with said external communications facility; and (h) a second signal utilization means, such as a first wireless transceiver means, connected with the signal conduction means at a second of said signal utilization points and operative thereby to communicate with said external communications facility as well as with a second wireless transceiver means located in the vicinity of the first wireless transceiver means.

BRIEF DESCRIPTION OF THE DRAWINGS

FIG. 7 shows key features of the second related system by way of a perspective view of plural rooms in a building having a power and signal distribution system such as the one of FIG. 4.

DESCRIPTION OF AN INITIAL RELATED SYSTEM

Details of Construction of First Related System

Figure 1:
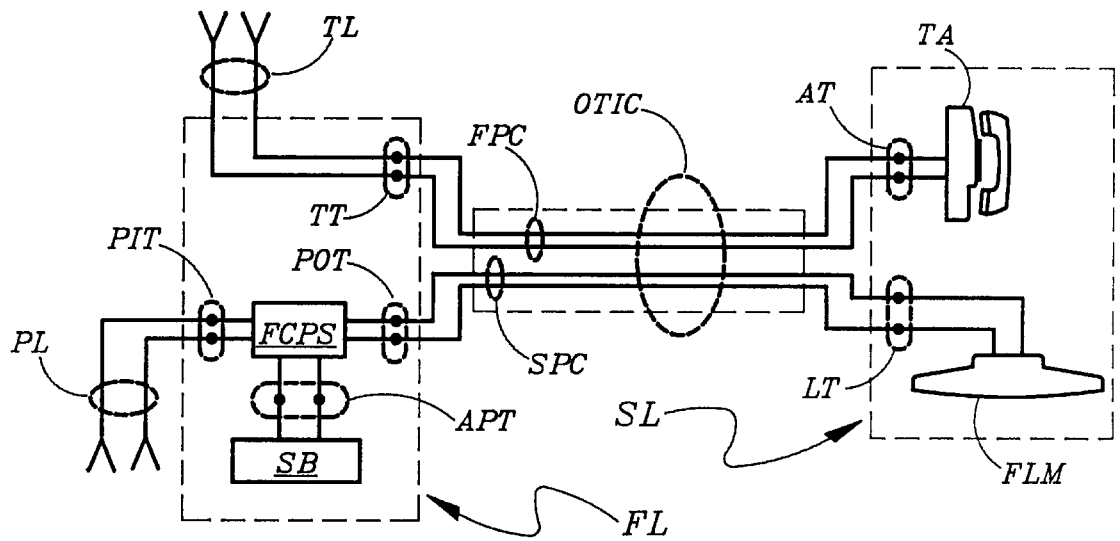
FIG. 1 provides an overall schematic view of an embodiment of a first system related to the present invention.

FIG. 1 illustrates the overall arrangement of an first system related to the present invention.

In FIG. 1, a telephone line TL and a power line PL both come into a first location FL and connect with a pair of telephone terminals TT and a pair of power input terminals PIT, respectively.

A frequency-converting power supply FCPS is connected with power input terminals PIT, and provides its output at power output terminals POT. A storage battery SB is connected with frequency-converting power supply FCPS by way of a pair of auxiliary power terminals APT.

At a second location SL, a telephone apparatus has a pair of apparatus terminals AT; and a fluorescent lighting means FLM has a pair of lighting terminals LT.

An ordinary telephone installation cable OTIC has a first pair of conductors FPC and a second pair of conductors SPC. The first pair of conductors is connected between telephone terminals TT and apparatus terminals AT; and the second pair of conductors is connected between power output terminals POT and lighting terminals LT.

Figure 2:
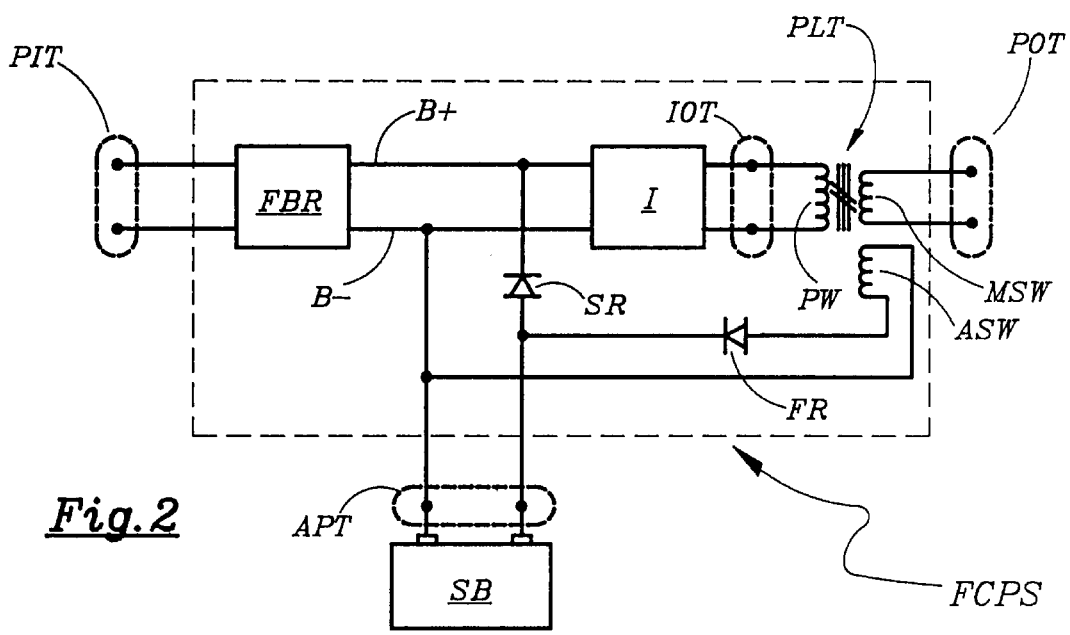
FIG. 2 provides details in respect to the frequency-converting power supply used in the embodiment of FIG. 1.

FIG. 2 provides details of frequency-converting power supply FCPS and its relationship with storage battery SB.

In FIG. 2, a full bridge rectifier FBR is connected with power input terminals PIT and provides its rectified output voltage between a B+ bus and a B− bus. An inverter I is connected with the B+ bus and the B− bus, and provides an AC voltage at inverter output terminals IOT. A power-limiting transformer PLT has a primary winding PW connected across the inverter output terminals (IOT), a main secondary winding MSW connected with the power output terminals (POT), and an auxiliary secondary winding ASW connected between the B− bus and the anode of a first rectifier FR, whose cathode is connected with the anode of a second rectifier SR. The cathode of the second rectifier (SR) is connected with the B+ bus.

The auxiliary power terminals (APT) are connected with the negative and positive terminals of the storage battery (SB) in such manner that the negative terminal connects with the B− bus and the positive terminal connects with the anode of the second rectifier (SR).

Figure 3:
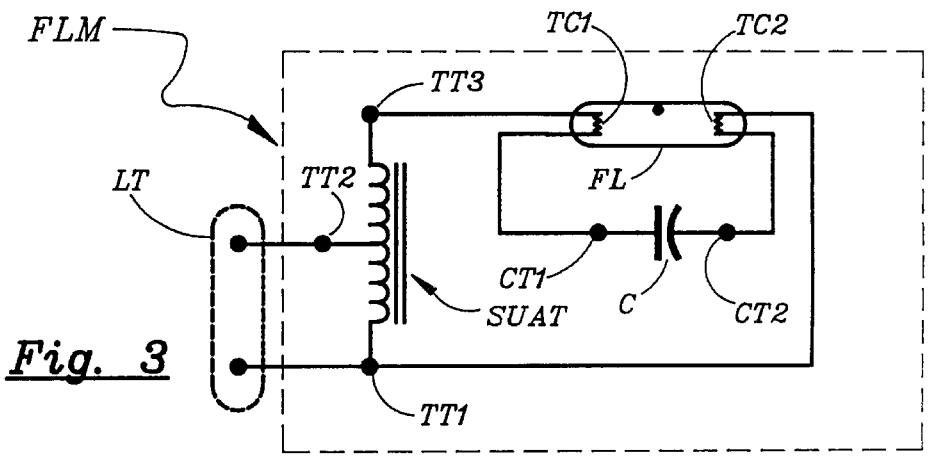
FIG. 3 provides details in respect to the fluorescent lighting means used in the embodiment of FIG. 1.

FIG. 3 provides details of the fluorescent lighting means (FLM).

In FIG. 3, a step-up auto-transformer SUAT has three transformer terminals TT1, TT2 and TT3. Transformer terminals TT1 and TT2 are connected with lighting terminals LT. Transformer terminal TT3 is connected with a first capacitor terminal CT1 of a capacitor C by way of a first thermionic cathode TC1 of a fluorescent lamp FL. A second capacitor terminal CT2 of capacitor C is connected with transformer terminal TT1 by way of a second thermionic cathode TC2 of the fluorescent lamp (FL).

Details of Operation of First Related System

With reference to FIGS. 1–3, the operation of the initial related embodiment may be explained as follows.

With frequency-converting power supply FCPS connected with an ordinary 120Volt/60 Hz power line, a 30 kHz squarewave voltage is provided at inverter output terminals IOT.

The output provided at the power output terminals (POT) is also a 30 kHz voltage. However, due to internal magnetic leakage between the primary and the secondary winding in the power-limiting transformer (PLT), the maximum amount of current available from the POT terminals is manifestly and non-dissipatively limited. In particular, the output from the POT terminals is inductively limited in such manner as to meet the specifications in the National Electrical Code for Class-2 electrical circuits.

The output from the POT terminals is connected with a pair of conductors (SPC) in the more-or-less ordinary telephone installation cable OTIC. The telephone line is also connected with a pair of conductors (FPC) in cable OTIC. Thus, both Class-2 electric power as well as ordinary telephone signals are transmitted between the first location (FL) and the second location (SL) by way of an ordinary telephone installation cable (OTIC).

The first location would typically be some central location within a building; and the second location would typically be a telephone booth located some distance away from this building. However, the two locations might also both be located within a single building.

As long as the frequency-converting power supply (FCPS) is being powered by power line voltage from the power line (PL), the storage battery (SB) is being charged from the auxiliary secondary winding (ASW) on the power-limiting transformer (PLT). In the event of power failure, the inverter (I) will be powered from the storage battery; the voltage on which has a magnitude about half that existing between the B+ bus and the B− bus whenever power line voltage is present. Whenever the inverter is being powered by the storage battery, the magnitude of the voltage provided by the ASW winding is too low to cause battery charging.

The 30Volt/30 kHz voltage provided by the FCPS power supply is transmitted to the fluorescent lighting means (FLM) in the second location (SL), thereby to provide illumination as might be useful in connection with using the telephone apparatus (TA).

In the fluorescent lighting means (FLM), the step-up auto-transformer (SUAT) receives the 30Volt/30 kHz inductively current-limited voltage from the POT terminals of the FCPS power supply and transforms it to a 10Volt/30 kHz inductively current-limited voltage. In combination with capacitor C, this 100Volt/30 kHz inductively current-limited voltage is appropriate for starting and powering the fluorescent lamp (FL) by way of series-resonant action.

Additional Comments Regarding First Related System (a) For further details in respect to frequency-converting power supplies and series-resonant ballasting circuits for fluorescent lamps, reference is made to U.S. Pat. No. Re. 31,758 to Nilssen and U.S. Pat. No. 3,710,177 to Ward.

(b) The series-resonant ballasting circuit described by Ward is especially suitable for powering a fluorescent lamp over a wide range of different driving voltage magnitudes. In particular, reducing the driving voltage magnitude by a factor of two, reduces the lamp light output by less than a factor of two.

(c) If it should happen that the distance between the first location (FL) and the second location (SL) is more than about 100 feet, it is advantageous to reduce the frequency of the driving voltage provided by the frequency-converting power supply (FCPS). In particular, for very large distances, it is anticipated that frequencies as low as 1 kHz may be used.

(d) The maximum amount of power available from the power output terminals (POT) of the frequency-converting power supply (FCPS) is 100 Watt; which is the maximum amount permissible for Class-2 electrical circuits in accordance with the National Electrical Code.

(e) It is expected that, in addition to use in connection with telephone booths and the like, the combined telephone and distribution system of FIG. 1 will find use in homes, offices, and the like; and that both telephone signals and Class-2 electric power will be available by way of ordinary telephone-type receptacle means. In particular, it is anticipated that the output from the frequency-converting power supply (FCPS) be provided at the point in a building from which the telephone signals are distributed, thereby to provide for both telephone signals as well as Class-2 electric power to be distributed by way of a common ordinary multi-conductor telephone cable to multiple locations within the building: typically to the locations where telephone instruments are located.

(f) The National Electrical Code is established by National Fire Protection Association, Batterymarch Park, Quincy, Mass. 02269. Its presently most up-to-date version is provided in a book entitled NATIONAL ELECTRICAL CODE 1984; which book is published by National Fire Protection Association. By reference, this book in general, and Article 725 thereof in particular, is herewith made part of this patent specification.

(h) The output from the frequency-converting power supply (FCPS) of FIGS. 1 and 2 is limited in accordance with the specifications in the NATIONAL ELECTRICAL CODE 1984 for Class-2 circuits; which means that it also complies with the specifications for Class-3 electrical circuits. Thus, under most conditions, the Volt-Ampere product available from the POT terminals of the FCPS power supply on a continuous basis may be as high as, but will not exceed, 100 Volt-Ampere.

As indicated in FIG. 2, limitation of Volt-Ampere product output is attained by providing for manifest magnitude-limitation on available output current; which manifest magnitude-limitation is attained by providing for less than 100% coupling between primary winding PW and main secondary winding MSW on power-limiting transformer PLT. Thus, current magnitude-limitation is attained by non-resistive or non-dissipative means.

(i) It is anticipated that glass or optical fiber means may be used instead of ordinary electrical conductors for providing telephone signal transmission between the first location (FL) and the second location (SL); in which case the OTIC cable of FIG. 1 would consist of optical fiber means in combination with electrical conductor means.

Thus, alternatively, the pair of lines labeled FPC in FIG. 1 represent an optical fiber means.

(j) The amount of power provided to the fluorescent lighting means (FLM) of FIGS. 1 and 3, is about 40 Watt.

Thus, the amount of power transmitted by way of the electric power transmission path (namely the SPC conductors of FIG. 1) is on the order of many Watt. On the other hand, the amount of power transmitted by way of the telephone transmission path (namely the FPC conductors of FIG. 1) is only on the order of a small fraction of one Watt.

(k) To minimize power losses and/or to permit longer transmission distances, it is anticipated that the SPC conductors of the OTIC cable be made of two or more parallel-connected pairs of the multiple individual conductors present in an ordinary telephone installation cable, or—alternatively—be made of heavier gauge conductors.

(l) In addition to, or instead of, the fluorescent lighting means (FLM) in FIG. 1, other electric power utilization means may be employed.'

Similarly, in addition to, or instead of, the telephone apparatus (TA) of FIG. 1, other telephone signal utilization means may be employed.

For instance, the second location (SL) may harbor a computer terminal connected with the telephone signal transmission means (namely the FPC condustors) as well as with the electric power transmission means (namely the SPC conductors). That way, information transfer may take place by way of the telephone signal transmission means, and Class-2 electrical power transmission for operation of the computer terminal may be provided by way of the electric power transmission means.

(m) A telephone utility signal line is herewith defined as that set of electrical conductors, fiber optic means, or radio link means, used for transmitting telephone and/or similar signals between the location of a telephone company's facility and the location of a telephone customer.

(n) The amount of electric power available from a telephone utility signal line is on the order of milli-watts.

(o) The amount of electric power available from an ordinary electric power line in a home or office, as by way of an ordinary electric wall receptacle means, is on the order of kilo-watts.

(p) There is no inherent reason for the magnitude of the power transmitted along-side the telephone utility signal line be limited to 100 Watt. Clearly, by providing for other means for fire-initiation protection, larger amounts of power may safely be provided.

(q) It is emphasized that the telephone utility signal line may be used for communications relative to the power being provided therealongside. Thus, for instance, a signal may be generated indicating the magnitude of the current being drawn by the load (or each load); and this signal may be transmitted to the source of power and used to compare the magnitude of the current drawn by the load versus the magnitude of the current being prodided from the source. Then, if there be any substantive difference therebetween, potential fire hazard may be indicated (as from an unauthorized load, such as a partial short circuit); and protective measures—such as circuit interruption—could be implemented.

(r) A basic concept herein disclosed in that of transmitting conditioned electric power alongside a telephone utility signal line, thereby to provide for a substantive amount of electric power at or near the point of utilization of the telephone signal. A corollary concept is that of transmitting information alongside a power transmission line; in which case information can be transmitted back relative to the utilization of the electric power. In either case, however, because of the immense ratio in magnitude difference between the power level associated with the electric power transmitted and the power level associated with the information signal transmitted, a high degree of separation is needed between the signal transmitting means and the power transmitting means. Consequently, due to the immense differences in transmission frequencies, to attain a high degree of electromagnetic separation, a fiber optic line would be a particularly suitable signal communication means to be used alongside a power transmitting line.

DESCRIPTION OF SECOND RELATED SYSTEM

Details of Construction of Second Related System

Figure 4A:
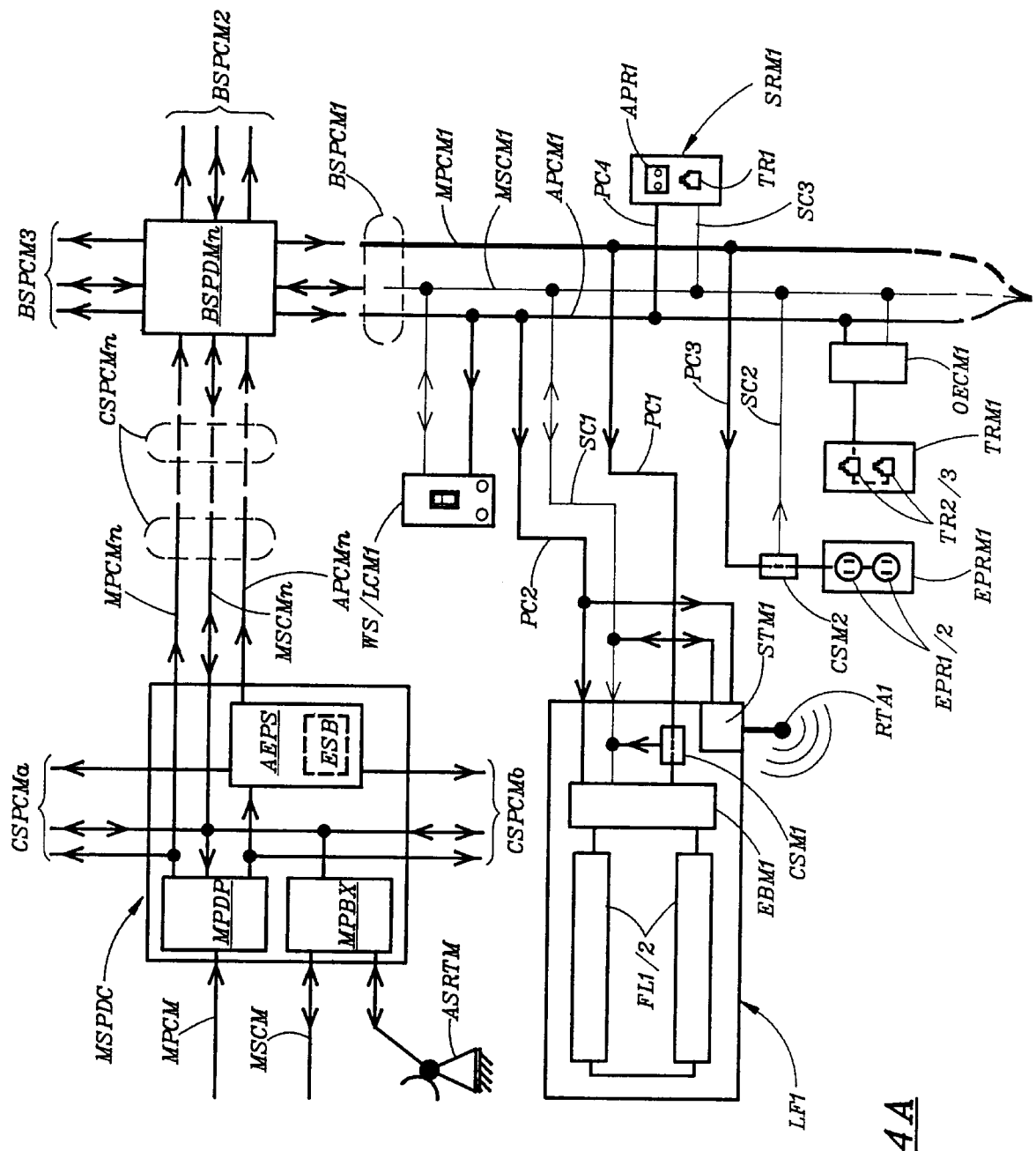
FIG. 4 schematically illustrates an embodiment of a second system related to the present invention.
Figure 4B:
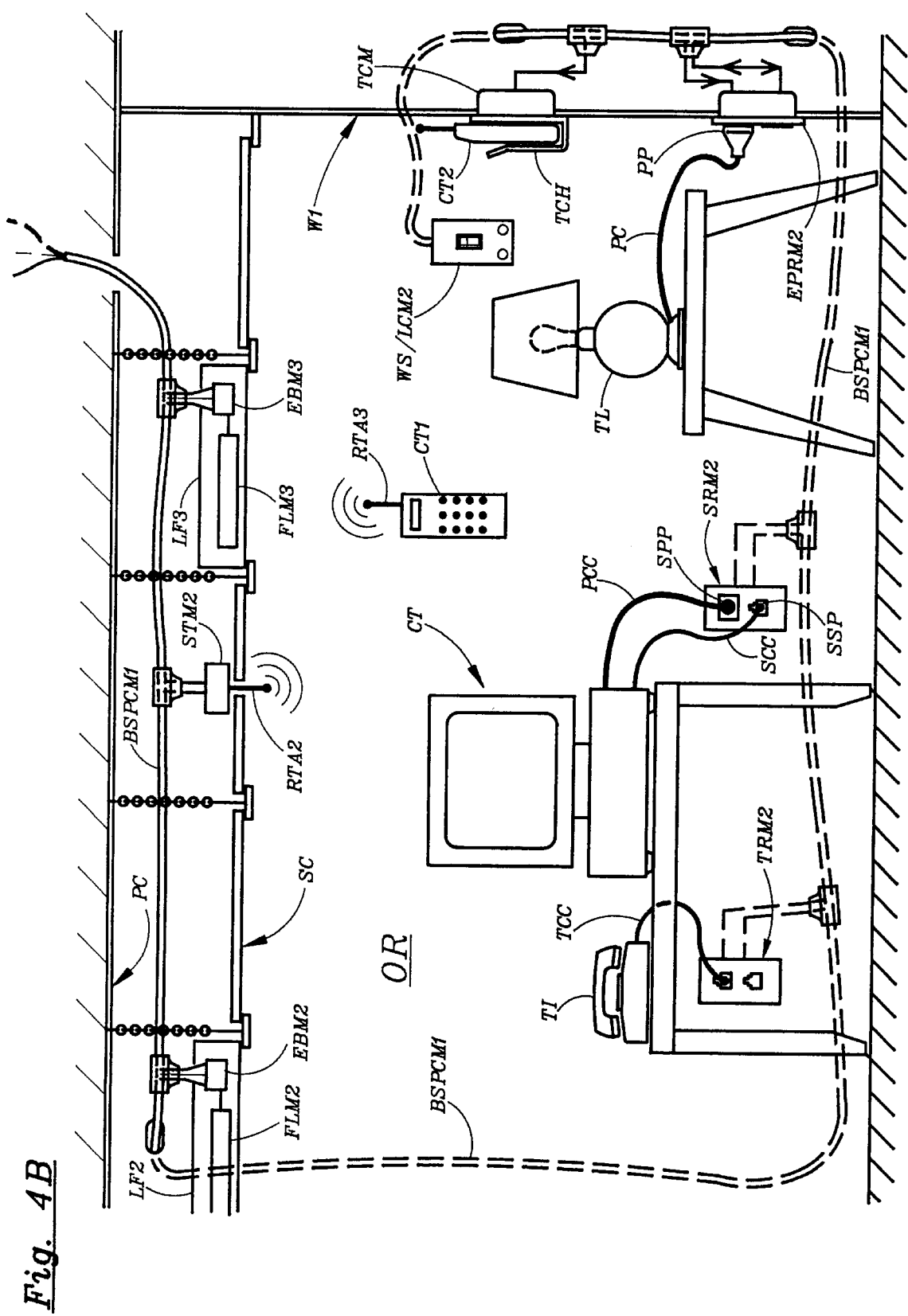

FIG. 4 schematically illustrates the systems aspect of the second related system. In FIG. 4, power from a local electric utility company is provided via main power conducting means MPCM (which may consist of two or more conductors transmitting single or multi-phase power) to main power distribution panel MPDP of main signal and power distribution center MSPDC. Main signal conducting means MSCM provides for signal transmission between a main private branch exchange MPBX and the local telephone utility company. Also connected with main private branch exchange MPBX is an external auxiliary signal receiving and transmitting means ASRTM; which might be a so-called microwave link.

Connected with main power distribution panel MPDP is an auxiliary electric power source AEPS; which includes an electric storage battery ESB.

Several sets of combined signal/power conducting means, CSPCMa, CSPCMb, and CSPCMn, are connected with main signal and power distribution center MSPDC. Each of these sets has a main power conducting means (ex: MPCMn) connected with main power distribution panel MPDP, a main signal conducting means (ex: SCMn) connected with main private branch exchange MPBX, and an auxiliary power conducting means (ex: APCMn) connected with auxiliary electric power source AEPS.

Combined signal/power conducting means CSPCMn connects with a branch signal/power distribution means BSPDMn; which, in turn, is connected with plural sets of branch signal/power conducting means BSPCM1, BSPCM2 and BSPCM3. Branch signal/power conducting means BSPCM1 comprises main power conducting means MPCM1, main signal conducting means MSCM1 and auxiliary power conducting means APCM1. Branch signal/power conducting means BSPCM1 then connects with various signal and/or power utilization and/or control means, as follows.

A wall switch and light control means WS/LCM1 is connected with main signal conducting means MSCM1 and auxiliary power conducting means APCM1.

A lighting fixture LF1 has two fluorescent lamps FL1/2 which are series-connected across the output of an electronic ballasting means EBM1; which is connected with: (i) main power conducting means MPCM1 via power conductor PC1, which runs through current sensing means CSM1; (ii) main signal conducting means MSCM1 via signal conductor SC1, which is connected with current sensing means CSM1; and (iii) auxiliary power conducting means APCM1 via power conductor PC2.

A signal transceiver means STM1, which is incorporated into lighting fixture LF1, is connected with power conductor PC2 and signal conductor SC1. It has a receive/transmit antenna RTA1 projecting out from the body of the lighting fixture.

An electric power receptacle means EPRM1 is connected with main power conducting means MPCM1 via a power conductor PC3; which power conductor PC3 runs through a current sensor means CSM2; which current sensor means, in turn, is connected with main signal conducting means MSCM1 via a signal conductor SC2. Electric power receptacle means EPRM1 has electric power receptacles EPR1/2; each of which is operative to receive and hold an ordinary electric power plug.

A special receptacle means SRM1 is connected with auxiliary power conducting means APCM1 and main signal conducting means MSCM1 via power conductor PC4 and signal conductor SC3, respectively. Special receptacle means SRM1 has an auxiliary power receptacle APR1 and a telephone receptacle TR1.

A telephone receptacle means TRM1 is connected with main signal conducting means MSCM1 via an optoelectronic converter means OECM1; which, in turn, is connected with auxiliary power conducting means APCM1. Telephone receptacle means TRM1 has two telephone receptacles TR2/3; each of which is operative to receive and hold an ordinary telephone plug.

A suspended ceiling SC is suspended below a permanent ceiling PC, and branch power/signal conducting means BSPCM1 is located in the space between. Below the suspended ceiling is an office/room OR.

Mounted in the suspended ceiling are lighting fixtures LF2 and LF3, which comprise fluorescent lighting means FLM2 and FLM3 as well as electronic ballasting means EBM2 and EBM3, all respectively. Electronic ballasting means EBM2 and EBM3 are each connected with main power conducting means MPCM1, main signal conducting means MSCM1, and auxiliary power conducting means APCM1 of branch signal/power conducting means BSPCM1.

Also mounted in the suspended ceiling is a signal transceiver means STM2, which has a receive/transmit antenna RTA2 protruding into office/room OR. Signal transceiver means is connected with main signal conducting means MSCM1 as well as auxiliary power conducting means APCM1 of branch signal/power conducting means BSPCM1.

Located somewhere in office/room OR is a cordless telephone CT1 with a receive/transmit antenna RTA3; and positioned into a telephone charger-holder TCH, which is mounted on a wall W1, is a cordless telephone CT2. Telephone charger-holder TCH includes a telephone charging means TCM, which is connected with auxiliary power conducting means APCM1 of branch signal/power conducting means BSPCM1.

An electric power receptacle means EPRM2 is connected with main power conducting means MPCM1 as well as with main signal conducting means MSCM1 of branch signal/power conducting means BSPCM1. A table lamp TL has a power cord PC with a power plug PP plugged into electric power receptacle means EPRM2.

A wall switch and light control means WS/LCM2 is connected with main signal conducting means MSCM1 and auxiliary power conducting means APCM1 of branch signal/power conducting means BSPCM1.

A computer terminal CT has a signal connection cord SCC and a power connection cord PCC having, respectively, a special signal plug SSP and a special power plug SPP. These two plugs are plugged into a special receptacle means SRM2; which, in turn, is connected with main signal conducting means MSCM1 and auxiliary power conducting means APCM1 of branch signal/power conducting means BSPCM1.

A telephone instrument TI is connected via a telephone connect cord TCC with a telephone receptacle of a telephone receptacle means TRM2; which, in turn, is connected with main signal conducting means MSCM1 and auxiliary power conducting means APCM1 of branch signal/power conducting means BSPCM1.

Figure 5:
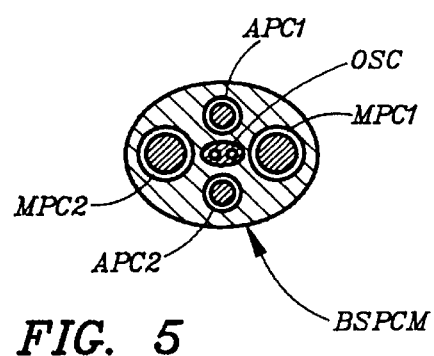
FIG. 5 shows a section of the combined main power, auxiliary power, and signal conduction means of the FIG. 4 embodiment.

FIG. 5 shows a cross-section of a branch signal/power conducting means BSPCM (such as BSPCM1), particularly indicating a pair of main power conductors MPC1 and MPC2, a pair of auxiliary power conductors APC1 and APC2, and an optical signal conductor OSC.

Figure 6:
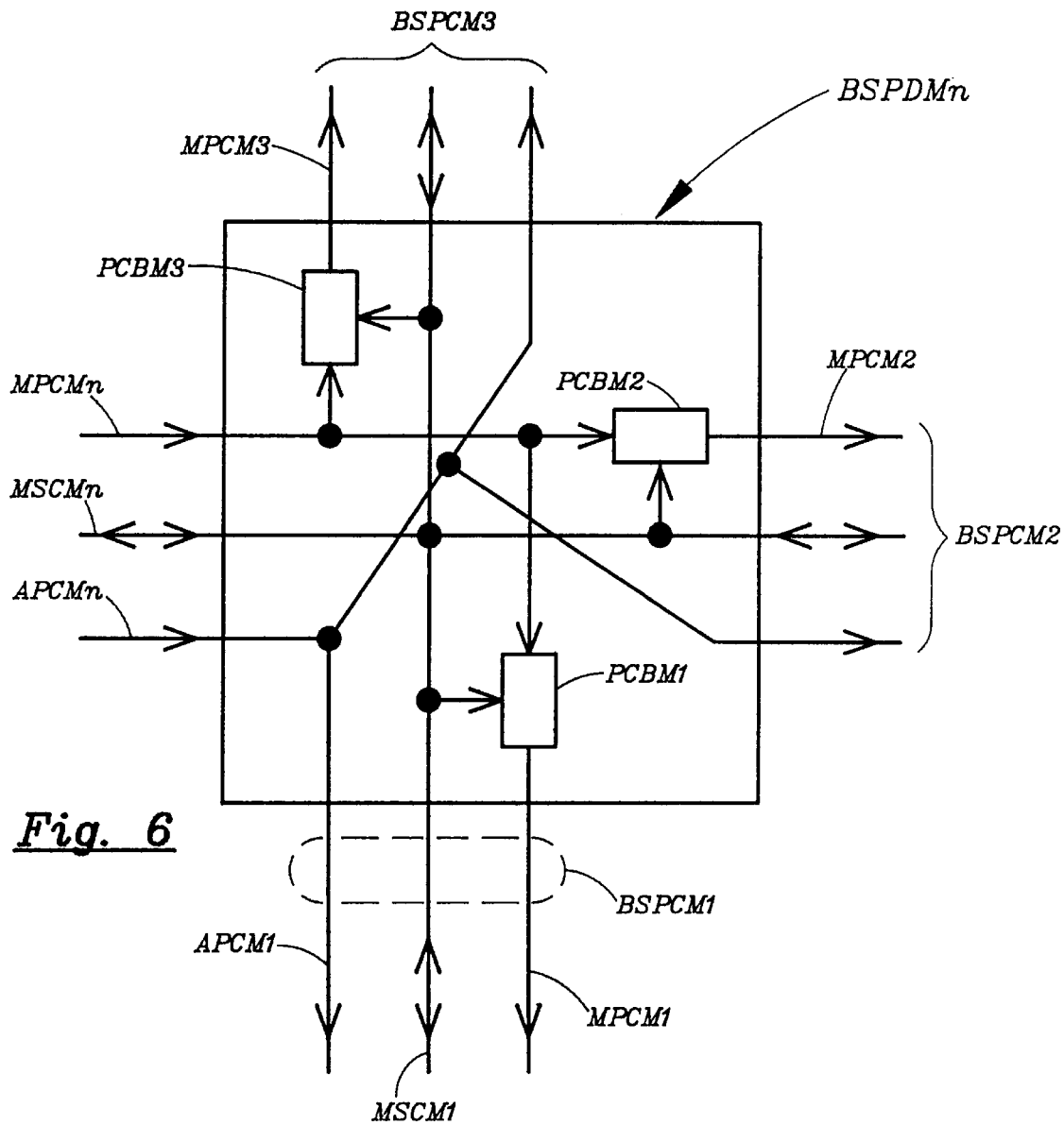
FIG. 6 shows details near a branch point of the combined power and signal distribution system of FIG. 4.

FIG. 6 shows key details of branch signal/power distribution means BSPDMn, particularly indicating that main power conductor means MPCMn connects with main power conducting means MPCM1 by way of a programmable circuit breaker means PCBM1; which programmable circuit breaker means is connected with main signal conducting means MSCM1. Otherwise, auxiliary power conducting means APCMn is shown to be directly connected with auxiliary power conducting means APCM1, and main signal conducting means MSCMn is shown to be directly connected with main signal conducting means MSCM1. Main power conducting means MPCM2 and MPCM3 connect with main power conducting means MPCM by way of programmable circuit breaker means PCBM2 and PCBM3, respectively.

FIG. 7, in a perspective view, illustrates how the system of FIG. 4 might appear in an office OF in which a person P is holding cordless telephone CT1 with receive/transmit antenna RTA3; which connects via wireless means with receive/transmit antenna RTA2; which connects with signal transceiver means STM2 (located above suspended ceiling SC, as in FIG. 4) and which protrudes from the ceiling into office OF.

Otherwise, the office has numerous ceiling lighting fixtures CLF1, CLF2 . . . CLFm; which are controlled from wall switch and light control means WS/LCM2. Another cordless telephone CT3 is shown standing on an office desk OD; computer terminal CT is shown to connect with special receptacle means SRM; telephone instrument TI is shown connected with telephone receptacle means TRM2; and electric power receptacle means EPRM3 is shown powering a floor lamp FL.

Details of Operation of Second Related System

In the combined signal and power distribution system of FIG. 4, at the main signal and power distribution center (MSPDC), electric power from the local electric utility is received at main power distribution panel MPDP via main power conducting means MPCM. The main signal conducting means (MSCM) provides for connection between the local telephone company and the main private branch exchange (MPBX); which is also connected with the auxiliary signal receive/transmit means (ASRTM) via which telephone and other signals are interchanged with some remotely located wireless receive/transmit means (not shown).

Within the main signal/power distribution center (MSPDC), the auxiliary electric power source (AEPS), which is connected with and powered from the main power distribution panel (MPDP), provides conditioned electric power to its three separate outputs, one of which is connected with auxiliary power distribution means AEPDMn. This conditioned electric power is similar to the unconditioned electric power received from the local electric utility company, except that it continues to be provided even during periods where delivery of electric power from the local electric utility company is interrupted; during which periods the conditioned electric power is derived from the electric storage battery (ESB) by way of a voltage conditioner means; which storage battery is charged by power derived from the local electric utility company during periods other than those associated with interruption in power delivery therefrom.

From the main signal/power distribution center, main electric power from the main power distribution panel as well as auxiliary electric power from the auxiliary electric power source are distributed to plural branch signal/power distribution means, such as via common signal/power conducting means CSPCMn to branch signal/power distribution means BSPDMn. Also, the various branch signal/power distribution means (such as BSPDMn) are each connected with the main signal/power distribution center (MSPDC) via a main signal conducting means (such as MSCMn).

From each branch signal/power distribution means (ex: BSPDMn), main electric power is distributed to its associated main power conducting means (ex: MPCM1) via a programmable circuit breaker means (ex: PCBM1). This programmable circuit breaker means is operative to interrupt the flow of power in its associated main power conducting means (ex: MPCM1) in response to information received via main signal conducting means MSCM; which carries the same information signals as do the other main signal conducting means (ex: MSCM1).

More particularly, using PCBM1 as an example, the programmable circuit breaker means operates as follows: (i) it senses the magnitude of the current flowing through it (i.e., the current delivered to its associated main power conducting means MPCM1) and derives an internal electrical measure for that magnitude; (ii) it receives information via the main signal conducting means (MSCM1) with respect to the magnitude of the current drawn by each of the loads connected with its associated main power conducting means (MPCM1); (iii) it compares its own measure of the current flowing through it with the sum of the magnitudes of the currents drawn by the various loads connected to its associated main power conducting means (MPCM1); and (iv) if the result of this comparison shows that more current is flowing through circuit breaker means PCBM1 than is accounted-for by the various loads powered through it, it acts to interrupt the flow of current to its associated main power conducting means. Thus, if an unauthorized load (such as an accidental short circuit) were to be connected with a given main power conducting means (ex: MPCM1), its associated programmable circuit breaker (PCBM1) would sense it and act to interrupt the supply of current to that given main power conducting means.

In other words, each of the various loads (ex: lighting fixture LF1) properly connected with a given main power conducting means (MPCM1) draws its power via a current sensing means (CSM1); which current sensing means is connected to a nearby main signal conducting means (MSCM1) and, via this signal conducting means, transmits information to the associated programmable circuit breaker means (PCBM1) with respect to the magnitude of the current flowing through it, thereby to provide to the associated programmable circuit breaker means information with respect to the (instantaneous) magnitude of each individual one of the various loads properly connected with the associated main power conducting means.

As a consequence of providing-for the above-indicated auditing and control of the current provided to the various loads served via a given programmable circuit breaker means, there is much reduced need for protecting the main power conducting means by mechanical armor, such as steel conduit. This is so for the reason that the above-described system prevents any substantial amount of power from being dissipated by way of an unauthorized load. Thus, an accidental short circuit of a main power conducting means is effectively prevented from constituting a fire initiation hazard.

In effect, except to the degree that power is being extracted via a proper current sensing means (ex: CSM1), each main power conducting means may be considered as a so-called Class-3 electrical circuit (which, according to the definitions of the National Electric Code, means that the maximum power available from it on a continuous basis must not exceed 100 Watt) and therefore substantially safe from fire initiation hazard.

Clearly, to meet the specifications of Class-3 electrical circuits, the sensitivity of each programmable circuit breaker means should be such as to act to interrupt the flow of current at some point before unauthorized power drain exceeds 100 Watt.

In subject combined signal and electric power distribution system, power is delivered to plural lighting fixtures (ex: LF1) mounted in a suspended ceiling (SC). Each of these lighting fixtures is connected both with its nearby main power conducting means (MPCM1) as well as with its nearby main signal conducting means (MSCM1); however, each of at least some of these lighting fixtures is also connected with its nearby auxiliary power conducting means. With respect to each of these latter lighting fixtures, the associated electronic ballasting means (ex: EBM1 in lighting fixture LF1) is so designed and constructed as to be operative to be powered from its associated auxiliary power conducting means (APCM1) during periods when the supply of power from its associated main power conducting means (MPCM1) is interrupted, thereby to continue to provide light output even during periods of main power failure.

Also, in at least some of the lighting fixtures, the ballasting means is so designed and constructed as to be able to receive instructions in the form of signals from from its associated main signal conducting means and to adjust the level of its light output in accordance with those instructions. More particularly, via a central switch and control means (ex: WS/LCM1), at least some of the lighting fixtures may be switched ON and OFF, as well as having its light output level adjusted, by way of signals transmitted from this central switch and control means to these lighting fixtures by way of the main signal conducting means.

Otherwise, power is delivered on a continuous basis from the auxiliary electric power source (AEPS), via the auxiliary power conducting means (such as via APCM1), to various loads for which power interruption would be particularly disadvantageous, such as computers (ex: CT) and telephone instruments (ex: TI). Although not shown (for the purpose avoiding unnecessary complexities in the drawings), the delivery of electric power via the various auxiliary power conducting means is also audited and controlled in the same manner as is the delivery of power via the various main power distributing means. Otherwise, for purposes of safety from fire initiation, it would be necessary to distribute the auxiliay electric power in mechanically armored conduits.

In attaining the above-identified functions, the main signal conducting means is required to handle numerous different signals at the same time: transmitting such signals back and/or forth between any two or more of numerous spaced-apart locations along the signal conducting means.

Several different techniques permit the substantially simultaneous transmission of numerous different signals along a single signal conducting means (such as an optical fibre), thereby effectively making this single signal conducting means provide-for a plurality of separate and independent communication channels. However, in instant situation, it is necessary not only to provide for such a plurality of separate communication channels, but it is also necessary to make any number of these channels accessible at any one or more locations along the signal conducting means.

In this other related embodiment, the above-indicated features are attained via a time-multiplexing technique combined with using an optical fibre as the signal conducting means; the operation of which combination is explained via simplified example, as follows.

In an optical fibre, a capacity of 100 separate broad-band signal channels are provided-for by dividing time into segments each having a duration of ten milli-seconds, and then by dividing each of these ten-milli-second-long time-segments into 100 time-slots, each having a duration of 100 micro-seconds. Thus, each individual communication channel is represented by a particular one of these hundred-micro-second-long time-slots, repeated once during each ten-milli-second-long time-segment; which is to say that each individual channel may be identified by a number (from 1 to 100) indicating what particular hundred-micro-second-long time-slot it constitutes within each ten-milli-second-long time-segment.

Still more particularly, each given one of the different current sensing means (ex: CSM1) includes electronic information processing means operative to convert the sensed magnitude of its through-flowing current into a commensurately digitally coded signal, and then to deliver this coded signal to the nearby main signal conducting means every ten milli-seconds during its designated hundred-micro-second-long time-slot. Thus, the information regarding the magnitude of the through-flowing current is updated once each ten milli-seconds; which is adequately frequent for most ordinary purposes. Each time after being delivered to the main signal conducting means, this coded signal courses along this main signal conducting means and, within a matter of less than a few micro-seconds after initial delivery, reaches the programmable circuit breaker means (PCBM1) associated with the particular main power conducting means (MPCM1) feeding current through the given one of the different current sensor means (i.e., CSM1).

This programmable circuit breaker means (PCBM1) has been pre-programmed to selectively receive whatever signal is provided during the hundred-micro-second-long time-slot designated to this particular given one of the different current sensor means (CSM1), as well as from each and every one of any other current sensor means (ex: CSM2) subject to current delivered from the particular main power conducting means (MPCM1) associated with this particular programmable circuit breaker means (PCBM1). As additional loads with additional current sensor means are added, the programming of the associated programmable circuit breaker means is correspondingly modified.

Within a given programmable circuit breaker means, the information received from the different associated current sensor means is processed such as to result in a single (digital) signal representing the sum of all the load currents flowing through all the different associated current sensor means; which sum signal is then compared with an internal (digital) signal representing the magnitude of the total current delivered through that given programmable circuit breaker means; which internal signal is derived from the output of a current sensor means built into the given programmable circuit breaker means and operative to sense the magnitude of the total current delivered therethrough. Then, if the comparison shows that the magnitude of the delivered current is larger than that of the sum of the individual load currents, the circuit breaker acts to interrupt the delivery of current.

With respect to the various wall switches and light control means (ex: WS/LCM1), the various remotely controllable electronic ballast means (ex: EBM1), the various telephone receptacle means (ex: TRM1), the various special receptacle means (ex: SRM1), the various signal transceiver means (ex: STM1), etc., each has one or more designated unique time-slots; and each can communicate via the main signal conducting means (ex: MSCM1) (by way of its associated unique time-slot) and thereby with each other as well as with the main private branch exchange (MPBX) as well as with the local telephone company and/or with the auxiliary signal receiving and transmitting means (ASRTM).

An ordinary telephone conversation can readily be carried-on over each one of the hundred-micro-second-long time-slots; which is to say: over each one of the 100 communication channels provided by the above-described time-multiplexing feature. To provide for this type of time-multiplexed telephone conversation, each telephone instrument (ex: TI or CT1) includes the following key elements and features.

(1) Each telephone instrument has a means for converting a continuous audio (or voice) signal into a stream of hundred-micro-second-long bursts of digitized information; which bursts are updated and repeated once each ten milli-seconds. In the preferred embodiment, this conversion is accomplished by: (i) converting the analog audio signal (via an analog-to-digital converter means) into a stream of digitized information with a clock rate of 100 kHz; MHz; (ii) dividing or segregating this stream of digitized information into ten-milli-second-long segments; (iii) directing each such segment into a stepping register clocked at 100 kHz, thereby absorbing that segment into this stepping register; (iv) increasing the clock rate of that stepping register to 10 MHz (after the complete ten-milli-second-long segment has been absorbed), thereby time-compressing each one of these ten-milli-second-long segments to a hundred-micro-second-long burst of "concentrated" digitized audio or voice signal; and (v) once each ten milli-seconds, providing such a burst (at some output terminal means) during a selected one of the 100 separate hundred-micro-second-long time-slots.

(2) Likewise, each telephone instrument has a digital-to-analog conversion means for converting the above-indicated stream of hundred-micro-second-long bursts of digitized information into a continuous voice signal; which process is accomplished in a manner that is completely analogous (in an obverse manner) to the above-described analog-to-digital conversion process.

(3) Also, each (of at least some) of the telephone instruments has a voice-scrambling means operative to make the digitized voice information non-decipherable except by way of a deciphering means having the appropriate algorithm for de-scrambling.

(4) Moreover, each telephone instrument has a means to connect with the main signal conducting means (ex: via MSCM1) (either via a telephone plug or via a wireless tranceiver means), and to enter its digitized voice information (in the form of the indicated repeated hundred-micro-second-long bursts) into any chosen one of the 100 separate communication channels (i.e., into any one of the 100 hundred-micro-second-long time-slots). Likewise, each telephone instrument has an obverse-analogous means to receive digitized voice information from any one of the 100 separate communication channels.

(5) Each one individual telephone instrument has a designated communication channel (i.e., a designated hundred-micro-second-long time-slot) via which it may be reached. When so initially reached by a signal from another telephone instrument, this signal conveys information with respect to the designated communication channel of the other telephone instrument (i.e., the equivalent of its extension number); which therefore permits the one telephone instrument to respond by automatically causing its digitized voice output to be entered into the main signal conducting means at the particular time-slot corresponding to that other telephone instrument's designated communication channel.

It is important to recognize that the length of the signal conducting means represents a factor that may affect the quality of this signal communication function. Thus, without making special provisions, the relatively simple above-described communication system and function will only operate properly as long as the length of the main signal conducting means is very short relative to the length of the wave-train associated with the hundred-micro-second-long burts of digitized information; which, with the speed of light being equal to 300,000 kilo-meters per second, means that the length of this wave-train is about 100,000 feet; which further means that the total length of the signal conducting means should not exceed about 1000 feet.

More particularly, with the communication signal traveling along its signal conductor means at about 300,000 km/sec, channel-to-channel interference may result when the transmission time between points amounts to a significant fraction of the duration of one of the hundred-micro-second-long time-slots.

On the other hand, by making each time-slot substantially shorter than 100 micro-seconds in duration, substantially more than 100 time-slots may be accommodated within each ten-milli-second-long time-segment; which, in turn, means that the total number of communication channels may be increased substantially. For instance, making each burst of digitized audio information have a duration of only one micro-second (i.e., making each time-slot only one micro-second long) would permit the signal conducting means to carry 10,000 independent communication channels versus only 100. However, except if making provisions of the type described hereinbelow, using one-micro-second-long time-slots would limit the permissible maximum length of the signal conducting means by a factor of 100 as compared with using hundred-micro-second-long time-slots.

Of course, if more than 100 communication channels were to be required, multiple signal distribution means could be provided for.

Otherwise, it is noted that main private branch exchange MPBX provides, by way of the optical fibre means, the master clock signal necessary to synchronize the operation of the various signal-generating and/or signal-utilizing means.

In situations where it is desirable to have substantially more than 100 separate communication channels and/or to operate over distances far in excess of 1000 feet, the following alternative embodiment is preferable: in which alternatively preferred embodiment each time-segment is only one milli-second long and each time-slot is only one micro-second long; which, in turn, means that a total of 1000 communication channels can be provided for by this alternatively preferred embodiment.

The alternatively preferred embodiment obviates the above-indicated potential channel-to-channel interference by: (i) having the signal conducting means (ex: MSCM1) comprise a looped optical fibre wherein one end of a continuous optical fibre (the start point) originates at the MPBX and the other end of the same continuous optical fibre (the end point) terminates at the MPBX; (ii) having the end point of this continuous optical fibre connected with its start point by way of an electronic digital delay and signal conditioning means (hereinafter referred-to simply as "delay means"); (iii) having the fibre-loop contained in the form of two separate optical fibres located adjacent one another within the main signal conducting means (with the far ends of the two optical fibres optically joined together at the far end of the signal conducting means); (iv) having each one of the various telephone instruments connected at one point in the fibre-loop; (v) having each telephone instrument so connected and arranged that it will enter its signals into the optical fibre in such manner that these signals will travel only in one direction toward the MPBX (which direction is hereinafter defined as "downstream", with the opposite direction being defined as "upstream"), while it will extract signals from the optical fibre as they come from the MPBX and/or from any other points upstream; (vi) having the delay means receive signals from the end point of the fibre-loop and, after a certain time delay, deliver the same signals at a reduced magnitude to the start point; and (viii) having this certain time delay being of such duration as to cause a signal having originated from a given telephone instrument to arrive back to this very same instrument exactly one milli-second later (at a reduced magnitude).

The reason for making the magnitude of the signals entered by the delay means (at the start point of the fibre-loop) substantially lower in magnitude than those signals the delay means receives from the fibre-loop (at its end point) relates to avoidance of potential interference; which potential interference and its avoidance arise as follows: (i) a given telephone instrument will, during each of its designated time-slots, send a freshly updated signal downstream along the optical fibre; (ii) this freshly updated signal will be entered by that given telephone instrument at its particular point of connection with the fibre-loop (i.e., point of entry) at the very time that its previously-entered signal reaches that very point of entry; (iii) by making the (freshly updated) signal then being entered far larger in magnitude than the previously-entered signal just then arriving, this previously-entered signal will in effect be erased (obliterated) by the currently-entered far-larger-in-magnitude signal. Then, as this far-larger-in-magnitude signal passes by other telephone instruments further downstream, or as it reaches the MPBX (i.e., the delay means), the associated downstream points of entry will only detect the most-recently-entered (freshly updated) signal.

Additional Comments Regarding Second Related System (r) Actually, the total number of useful communication channels in the above-described alternatively preferred embodiment will be less than 1000 by a number that is equal to the duration of an individual time-slot (i.e., one micro-second) divided into the total time delay associated with a signal traveling twice the distance to the telephone instrument located farthermost away from the MPBX. If that distance were to be 10,000 feet, the number of available communication channels would be 980 instead of 1000.

(s) A different approach to implementing the above-described alternatively preferred embodiment involves the use of two separate fibre-loops: one loop for receiving the signals entered by the various telephone instruments and for transmitting these signals downstream toward the MPBX; and one loop for receiving signals from the delay means to transmit these signals to the various telephone instruments. By so using two separate fibre-loops, there will be no need to require of each telephone instrument to receive a relatively weak signal and to emit a much stronger signal.

(t) In the above-described alternatively preferred embodiment, the analogue telephone signal has to be compressed into one-micro-second-long time-slots updated once each milli-second; which implies a degree of "time-compression" of 1000:1 versus only 100:1 for the time-compression associated with the basic preferred embodiment.

(u) A key recognition underlying the invention herein described relates to the fact that the overwhelming percentage of electric power distribution within a building is done for the purpose of lighting, especially so in commercial buildings. Thus, the lighting function becomes the chief determinant of where and how electric power conductors are distributed within a building. By further recognizing that a properly designed telephone signal distribution system can be installed as permanently as can the electric power distribution system without losing any of the required flexibility and that the signal distribution conductors can in fact safely be laid down alongside the electric power conductors, it becomes clear that doing so provides for substantial overall benefits in the form of reduced installation cost, decreased complexity and increased flexibility.

In particular, the relatively heavy gauge electric power distribution conductors may be reduced in number and total lengths for two basic reasons: (i) load control (such as ON/OFF switching of lights) can be accomplished remotely from the load without actually stringing the electric power conductors to the point of control (i.e., to the wall switch); and (ii) due to increased protection against fire initiation hazards, it becomes feasible to distribute electric power via a single pair of heavy gauge distribution conductors as contrasted with distributing electric power via a multiplicity of pairs of distribution conductors all radiating out from a central power panel.

Thus, in sum total, instant invention relates to the proposition of distributing both electric power and communication signals along a single common main signal and electric power conducting means, branching off along the way from this common main signal and electric power conducting means at whatever points convenient. Thus, instant invention relates to providing in a building the equivalent of what for automobiles has become known as "a single wire power distribution system".

(v) It is anticipated that TV signals as well may be distributed via instant combined signal and electric power distribution system.

(w) As instant invention relates to a combined signal and electric power distribution system and various key features thereof, information on how to accomplish some of the details of these key features has been omitted for sake of brevity and clarity. However, based on the description provided, all the features indicated are readily attainable by a person having ordinary skill in the art pertinent hereto on basis of well known prior art.

For instance, such a person would readily know how to attain the functions associated with the signal transceiver means STM2 installed in suspended ceiling SC and connected with main signal conducting means MSCM1 and alternative power conducting means APCM1; which signal transceiver means is continuously transmitting and receiving on all of the communication channels provided by main signal conducting means MSCM1. Thus, as a person P comes into office OF carrying his own personal cord-less telephone CT1, he is—via receive/transmit antenna RTA2 and signal tranceiver means STM2—automatically (i.e., without taking any express log-in action) in contact with his own personally designated communication channel on main signal conducting means MSCM1.

(x) One of the key concepts underlying instant invention is that of using information transmission and processing for keeping accurate track of the flow of electric power, thereby to permit accurate control thereof. As a consequence, any substantive unauthorized power dissipations are detected and prevented, thereby providing for an exceptionally high degree of protection against electrical fire intiation hazards.

In fact, outside of the authorized points of power extraction (ex: lighting fixture LF1), the total power distribution system may be considered as a Class-3 electrical circuit.

DESCRIPTION OF A PREFERRED TELEPHONE INSTRUMENT

Details of Construction of the Preferred Telephone Instrument

Figure 8:
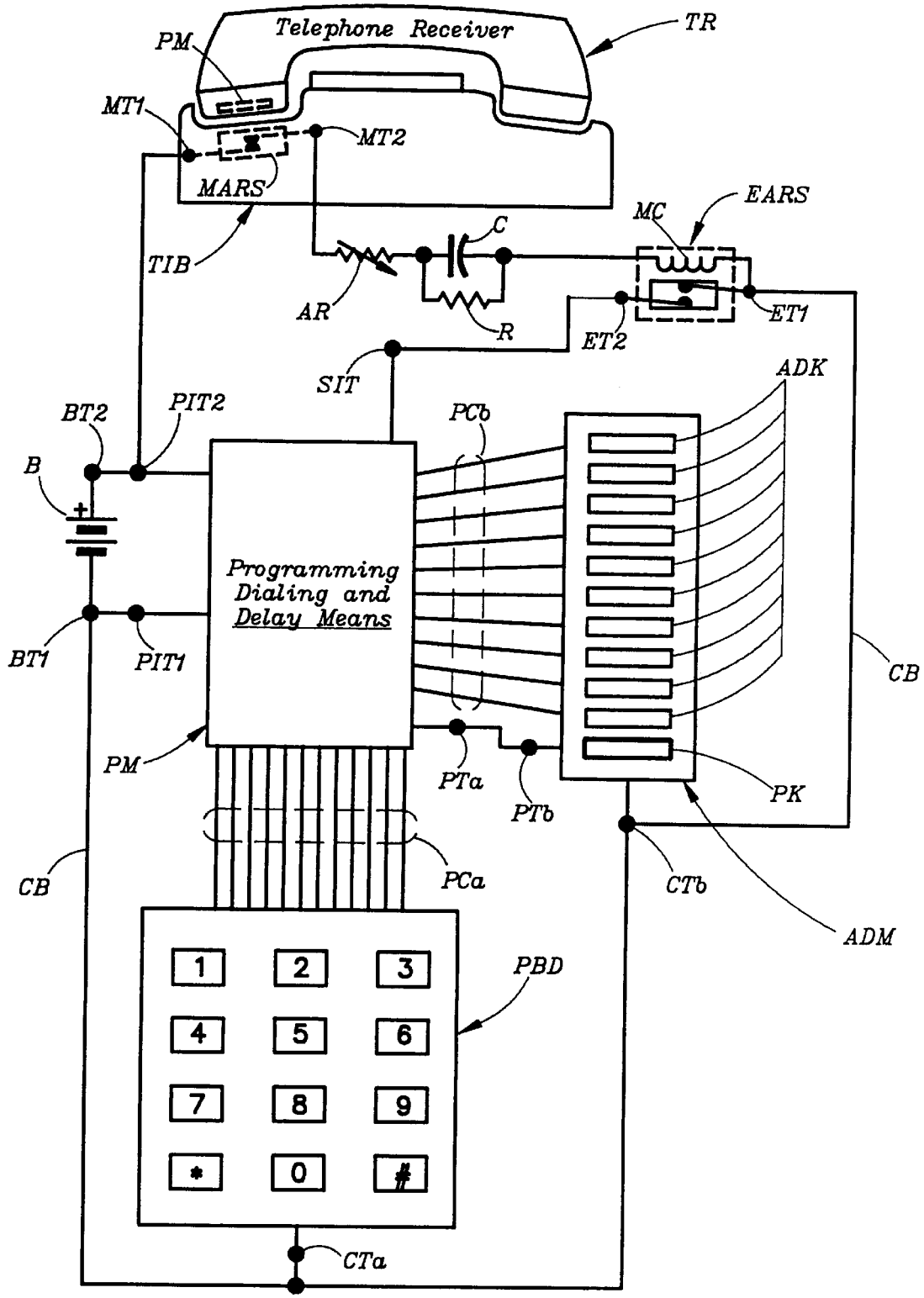
FIG. 8 illustrates a telephone instrument for use in the embodiment of FIG. 4.

FIG. 8 schematically illustrates the preferred embodiment of a telephone instrument for use in the power and signal distribution system of FIG. 4.

In FIG. 8, a telephone receiver TR is shown resting in its ordinary not-in-use position on a telephone instrument base TIB. Built into the ear piece (or, alternatively, into the mouth piece) of the telephone receiver is a permanent magnet PM, shown in phantom outline; which permanent magnet PM is aligned with a normally-closed magnetically-activated reed switch MARS, also shown in phantom outline, located in the telephone instrument base TIB directly underneath permanent magnet PM. Switch MARS has two switch terminals MT1 and MT2.

An ordinary push-button telephone dial is shown as PBD; which dial PBD has a common terminal CTa connected with a common bus CB, as well as plural output terminals each connected via plural conductors PCa with a corresponding input terminal of a programming, dialing and delay means PM.

Common bus CB is connected with a power input terminal POT1 of programming means PM as well as with battery terminal BT1 of a battery B, whose other battery terminal BT2 is connected with power input terminal PIT2 of programming means PM as well as with terminal MT1 of switch MARS. Common bus CB is also connected with common terminal CTb of an auxiliary dialing means ADM as well as with switch terminal ET1 of normally-open electrically-actuated reed switch EARS. Terminal ET1 is connected with terminal MT2 of switch MARS by way of magnetizing coil MC (contained within switch EARS), a parallel-combination of a capacitor C and a resistor R, and an adjustable resistor AR. The other switch terminal of switch EARS is designated ET2 and is connected with a special input terminal SIT of programming means PM.

Auxiliary dial means ADM has plural output terminals, each connected via plural conductors PCb with a corresponding input terminal of programming means PM.

Programming means PM has a program terminal PTa that is connected with a corresponding program terminal PTb on auxiliary dialing means ADM; which dialing means has a program key PK as well as plural automatic-dial keys ADK.

Details of Operation of the Preferred Telephone Instrument

The telephone arrangement illustrated in FIG. 8 functions as an ordinary push-button telephone having ordinary push-button dialing via push-button dial PBD as well as automatic dialing of plural pre-programmable telephone numbers via dial means ADM.

Of course, by way of connections and conductors not shown, programming means PM is connected in circuit with the electrical terminals of the telephone instrument represented by base TIB and receiver TR; which telephone instrument, in turn, is connected with an ordinary telephone line.

Aside from providing for the usual functions of manual and automotive dialing of telephone numbers, programming means PM also provides for a function whereby—whenever its special input terminal SIT is activated—it will cause a certain special (pre-programmable) telephone number to be dialed, but only after a brief time-delay, such as about two seconds.

Activation of special input terminal SIT occurs whenever reed switch EARS momentarily closes. The momentary closing of reed switch EARS occurs each time telephone receiver TR is removed from its usual not-in-use position. More particularly, by action of permanent magnet PM, whenever telephone receiver TR rests in its ordinary not-in-use position, reed switch MARS is actuated and therefore exists in the state of being an open circuit (i.e., reed switch MARS is then open). However, as soon as telephone receiver TR is lifted from its ordinary not-in-use position, reed switch MARS reverts to its normal non-actuated state, which is that of being a short circuit (i.e., reed switch MARS is then closed). Upon closing of reed switch MARS, the battery voltage from battery B will be applied across the magnetizing coil MC of reed switch EARS, which therefore will become actuated. Thereafter, reed switch EARS will remain actuated until capacitor C reaches a certain state of charge, at which point reed switch EARS will again become non-actuated. The time period required for capacitor C to reach this certain state of charge is determined by capacitance of C as well as by the internal resistance of magnetizing coil MC as added-to the resistance of adjustable resistor AR.

Once telephone receiver TR is placed back into its ordinary not-in-use position, reed switch MARS again gets activated thereby opening the connection between magnetizing coil MC and battery B. From that point in time, the charge on capacitor C will drain away via resistor R, thereby to be ready to cause momentary activation of reed switch EARS at some later time when telephone receiver TR is again lifted.

A person would use the telephone instrument of FIG. 8 in the following manner.

(1) By merely removing the telephone receiver from its usual not-in-use position, after a delay of about two seconds, a certain pre-programmed (partial or complete) telephone number will automatically be dialed; thereby providing the function of totally automatic dialing of this certain telephone number; which certain telephone number could be an emergency telephone number, or it could be a very-frequently-dialed telephone number, or it could be a common part or pre-fix of some frequently-dialed telephone numbers (such as the three-digit pre-fix number in a given local calling area).

(2) In case the certain pre-programmed telephone number is only a partial telephone number (such as a pre-fix), all that is necessary for the person to do—after having lifted the receiver—is to complete the dialing of the desired telephone number by keying-in the additional numerals on the regular push-button dial (PBD).

(3) In case the person wishes to reach some other telephone number (i.e., other than the desired telephone number), he merely proceeds to dial that other telephone number, either by pressing one of the pre-programmed automatic-dial keys (ADK) within the two second delay period, or by keying-in that other telephone number in a regular manner via the regular push-button dial (PBD), starting this dialing procedure before the end of the two second delay period.

(4) To program the certain (partial or complete) telephone number into the programming means (PM), it is necessary to leave the telephone receiver in its usual not-in-use position and then, in chronological order, to: (i) momentarily press programming key PK; (ii) key-in the partial or complete telephone number on the keys of the regular push-button dial (PBD); and (iii) again press programming key PK.

(5) To program some other (partial or complete) telephone number into the programming means (PM), it is necessary to leave the telephone receiver in its usual not-in-use position and then, in chronological order, to: (i) momentarily press programming key PK; (ii) momentarily press one of the plural automatic dial keys (ADK); (iii) key-in the partial of complete telephone number on the keys of the regular push-button dial (PBD); and (iv) again press programming key PK.

Additional Comments Regarding Preferred Telephone Instrument (y) In FIG. 8, many of the details of the telephone instrument of FIG. 8 have been omitted for the reasons that: (i) they form no part of the present invention; and (ii) to a person having ordinary skill in the art pertinent hereto, they represent obvious subject matter and would, if included, merely hinder the ready understanding of the present invention.

(z) Instead of using battery B for powering programming means PM and/or for powering reed switch EARS, DC voltage available from the telephone line may be used.

Moreover, the function attained by way of the permanent magnet (PM) and the reed switches (MARS, EARS) may instead be provided by utilizing the signal and/or voltage that becomes available within an ordinary telephone instrument (connected with an ordinary telephone line) whenever the telephone receiver is removed from its ordinary not-in-use position.

DESCRIPTION OF CORDLESS-CELLULAR TELEPHONE SYSTEM

A preferred embodiment of the cordless-cellular telephone system is described and explained via FIGS. 9 through 17.

Details of Construction

Figure 9:
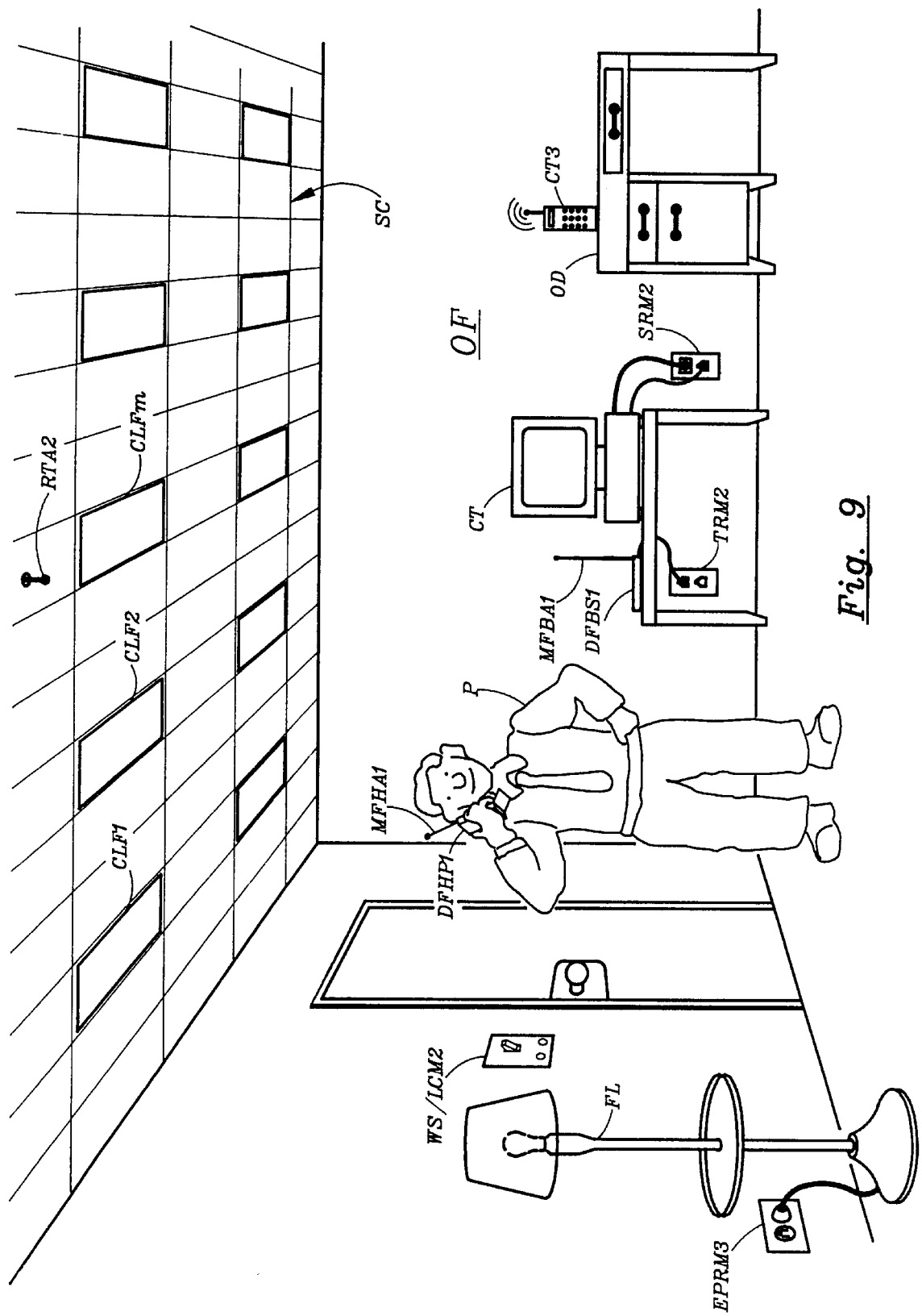
FIG. 9 illustrates an embodiment of a third system related to the present invention by showing in an office a dual-function base-station with a dual-function cordless hand-piece in active use by a person.

FIG. 9 shows an arrangement identical to that of FIG. 7 except for having replaced telephone instrument TI and cordless telephone CT1 with a dual-function base station DFBS1 and a dual-function hand-piece DFHP1, respectively. Base station DFBS1 has a multi-function antenna MFBA1; and dual-function hand-piece DFHP1, which person P holds near an ear in an active-use-position, has a multi-function hand-piece antenna MFHA1.

Figure 10:
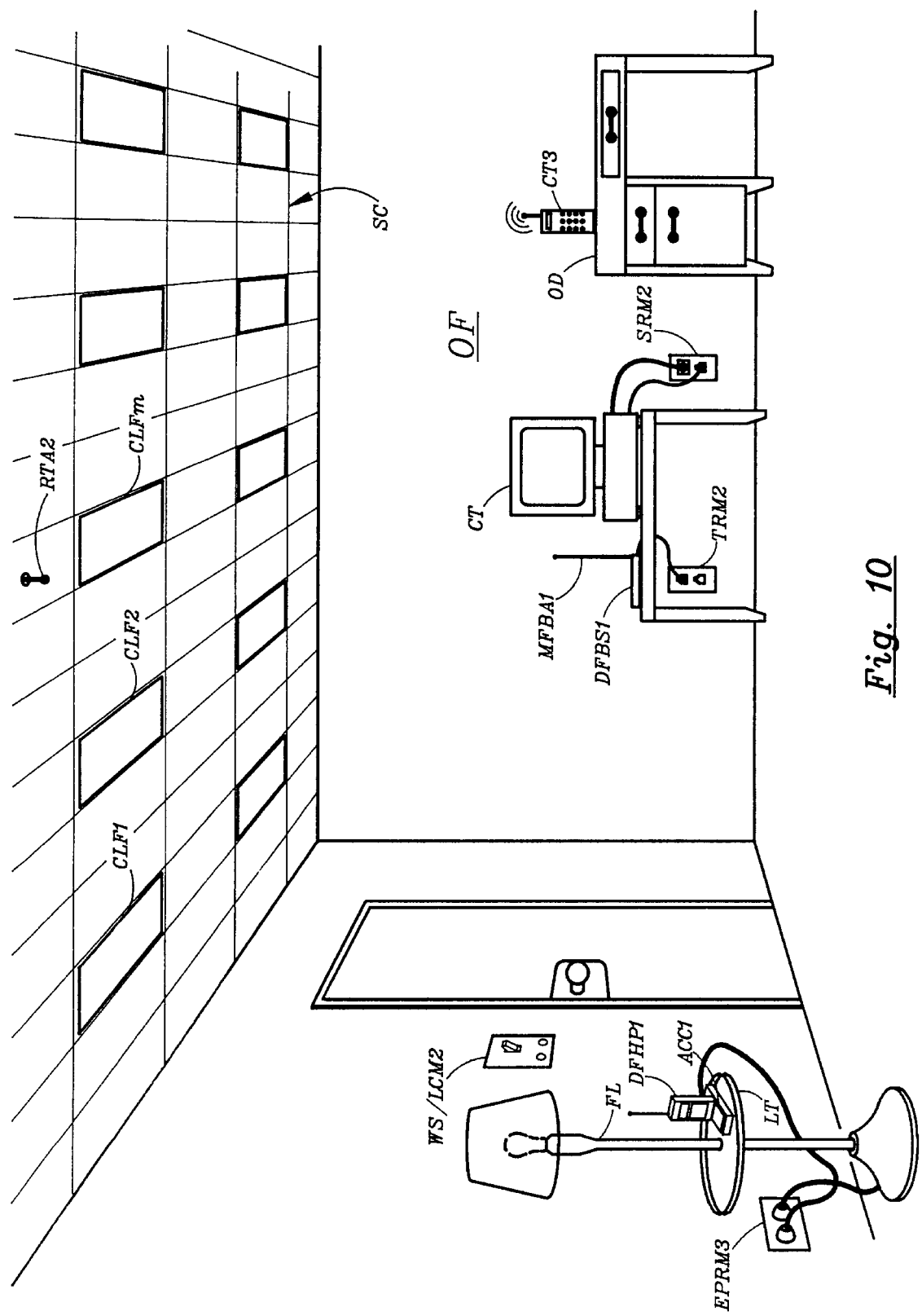
FIG. 10 illustrates the dual-function base-station with the dual-function cordless hand-piece located within cordless range, but otherwise not in use.

FIG. 10 illustrates an arrangement identical to that of FIG. 9, except that person P has left his office OF and placed his dual-function hand-piece DFHP1 in an auxiliary charging cradle ACC1 located on a lamp-table LT associated with floor lamp FL.

Figure 11:
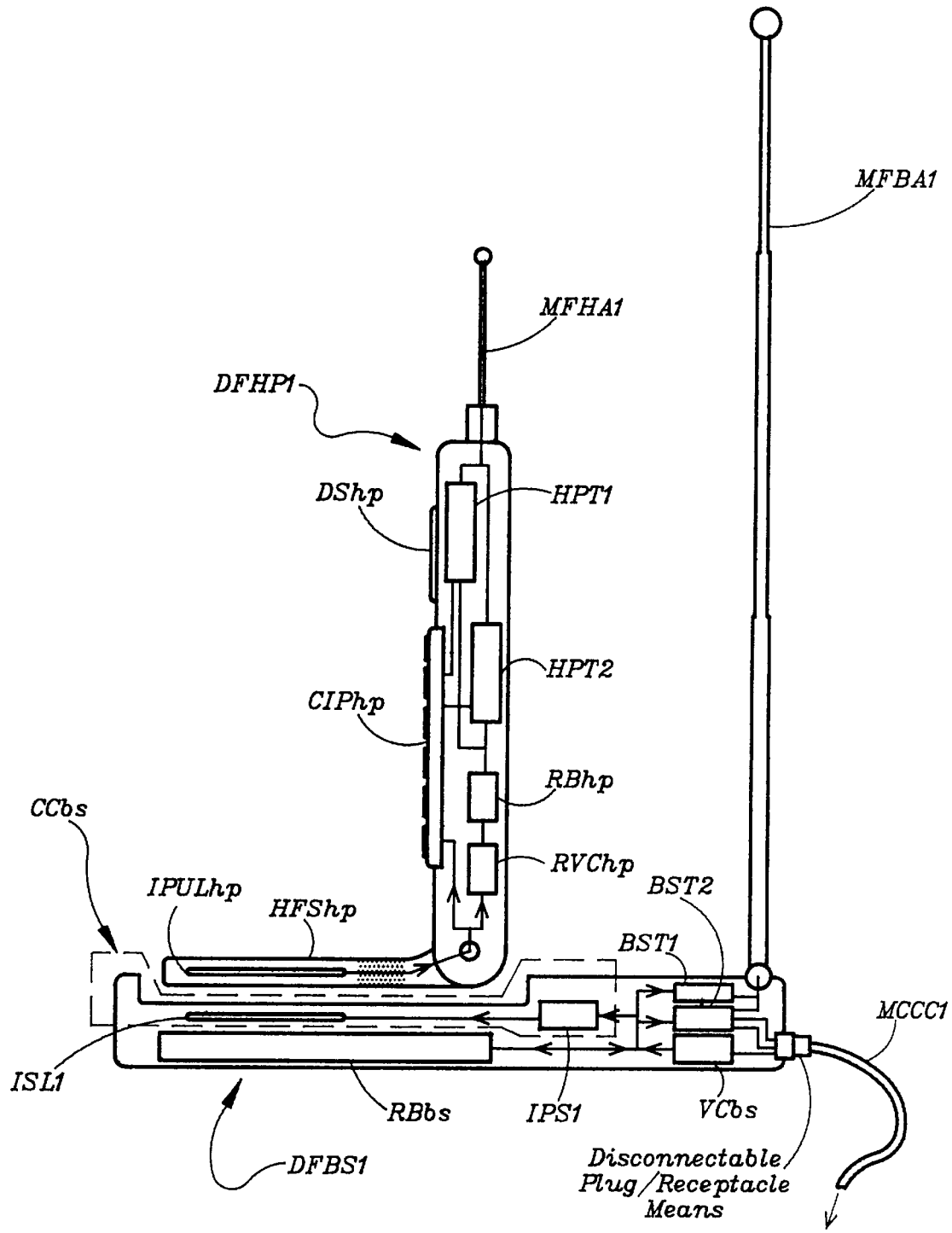
FIG. 11 represents a pseudo-cross-sectional view of the dual-function base-station of FIG. 9 with the dual-function cordless hand-piece cradled therein.

FIG. 11 provides a pseudo-cross-sectional view of dual-function base station DFBS1 and dual-function hand-piece DFHP1. In FIG. 11, hand-piece DFHP1 is shown resting in a charging cradle CCbs built into base-station DFBS1.

Hand-piece DFHP1 includes a first hand-piece transceiver HPT1 and a second hand-piece transceiver HPT2; which transceivers are both connected with multi-function hand-piece antenna MFHA1.

In hand-piece DFHP1, each of transceivers HPT1 and HPT2 is connected with a rechargeable battery RBhp; which battery RBhp is connected with a rectifying voltage conditioner RVChp; which, in turn, is connected with (and, at least at times, receives power from) inductive pick-up loop IPULhp disposed within a hinged flip-stand HFShp. Furthermore, hand-piece DFHP1 has a control interface-panel CIPhp with a display screen DShp; which control interface-panel CIPhp is connected with transceivers HPT1 and HPT2.

Base-station DFBS1 includes a first base-stand transceiver BST1 and a second base-stand transceiver BST2; which transceivers are both connected with multi-function base-station antenna MFBA1.

In base-station DFBS1, each of transceivers BST1 and BST2 is connected with multi-function antenna MFBA1 as well as with rechargeable battery RBbs; which rechargeable battery RBbs is connected with voltage-conditioner VCbs; which voltage-conditioner VCbs is, in turn, connected with (and powered from) a source of outside power (such as an ordinary household electric power receptacle) via multi-conductor connect-cord MCCC1. Transceiver BST1 is connected with a first telephone-utility line (such as provided at an ordinary home telephone receptacle) by way of multi-conductor connect cord MCCC1; and transceiver BST2 is connected with a second telephone-utility line by way of multi-conductor connect cord MCCC1.

In dual-function base-station DFBS1, an inverter-type power supply IPS1 is connected with rechargeable battery RBbs as well as with inductive supply loop ISL1.

Dual-function hand-piece DFHP1 is shown resting—by way of its hinged flip-stand HFShp—in charging cradle CCbs of base-station DFBS1 in such manner that inductive pick-up loop IPULhp is parallel-aligned with inductive supply loop ISL1.

Figure 12:
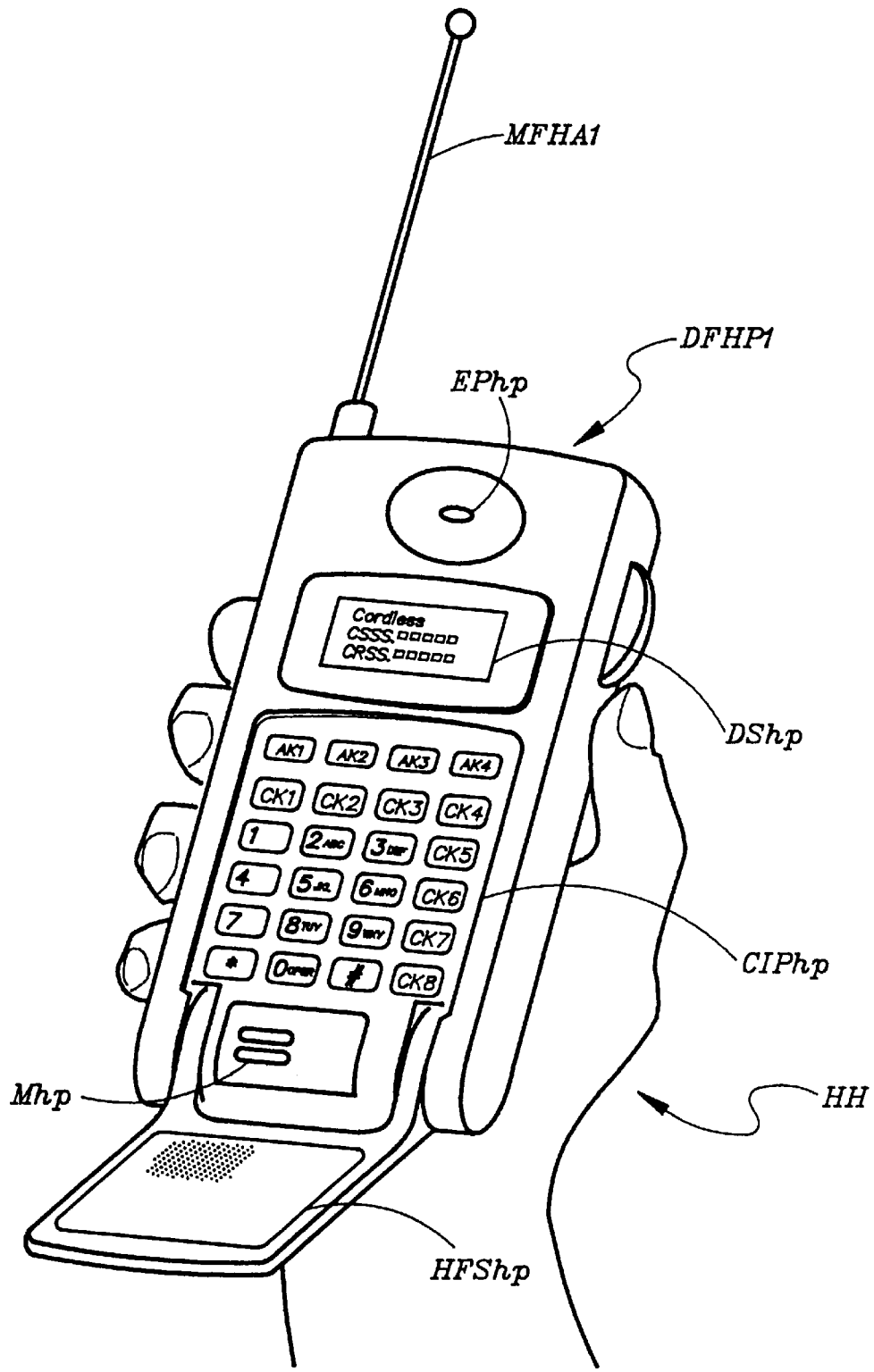
FIG. 12 illustrates the dual-function cordless hand-piece of FIG. 9 in further detail.

FIG. 12 illustrates multi-function hand-piece MFHP1 as held by a human hand HH.

In FIG. 12, display screen DShp is shown as displaying which particular mode (Cordless) of the three alternatively available modes (Cordless, Cellular, Dual) in which it happens to be functioning at the moment. In addition, the display screen is shown displaying the signal strength CSSS of the nearest cordless base station as well as the signal strength CRSS of the nearest cellular base station.

Otherwise, dual-function hand-piece DFHP1 is indicated to have an ear-piece EPhp, a microphone Mhp, as well as the regular complement of telephone dialing keys.

In addition to the regular complement of dialing keys, control interface-panel CIPhp has control keys CK1 through CK8 in addition to auxiliary keys AK1 through AK4.

Figure 13:
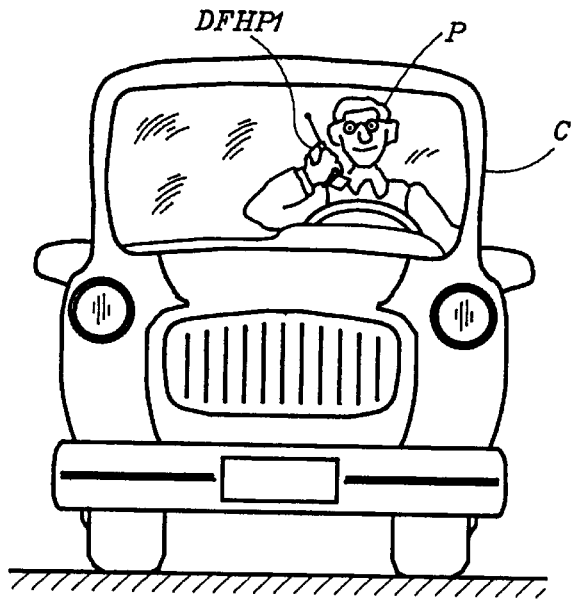
FIG. 13 illustrates the dual-function cordless hand-piece in a situation of having been moved beyond the cordless range of its in-office base-station and having thereby effectively been converted into an ordinary cellular telephone.

FIG. 13 shows person P in a car C with dual-function hand-piece DFHP1 held to his ear.

Figure 14:
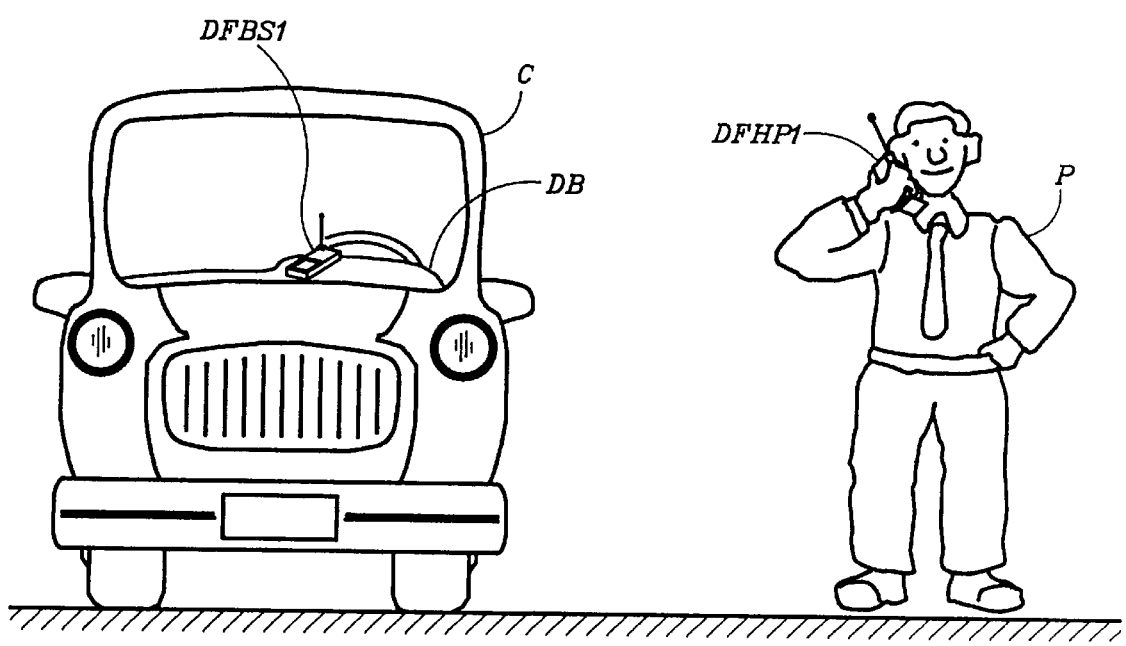
FIG. 14 shows the dual-function base-station disconnected from its power and signal supply cord, thereby operating as a portable battery-powered relay between the cordless hand-piece and the cellular telephone system.

FIG. 14 shows dual-function base-station DFBS1 standing on the dashboard DB of car C, with person P standing some distance away from car C while holding dual-function hand-piece DFHP1.

Figure 15:
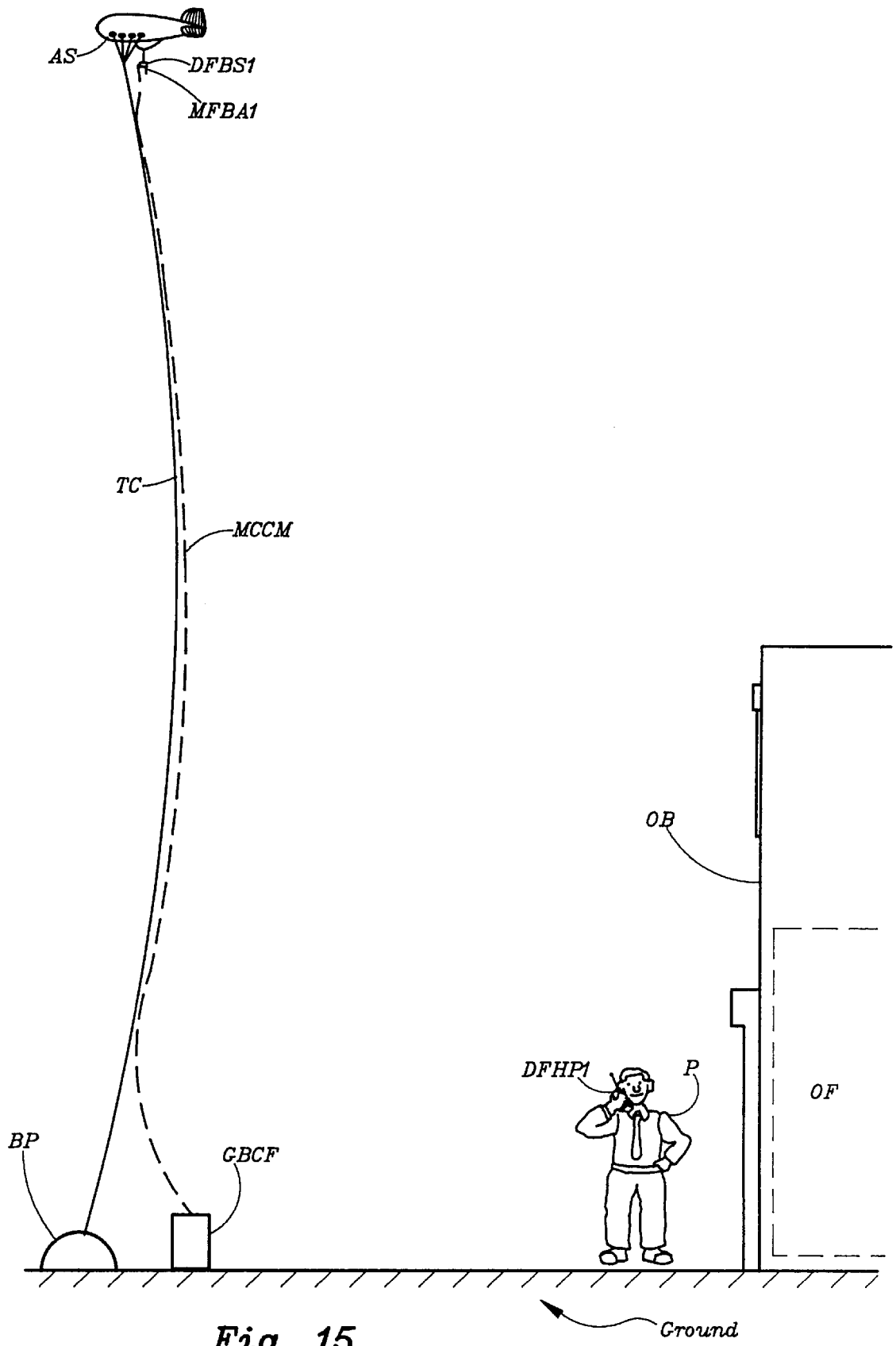
FIG. 15 illustrates an arrangement wherein a dual-function base-station is placed in a tethered aerostat.

FIG. 15 shows an aerostat AS tethered by way of a tether-cord TC to a base point BP. Hanging under aerostat AS is dual-function base-station DFBS1 with multi-function base-antenna MFBA1. Dual-function base-station DFBS1 is connected—via multi-conductor cord means MCCM running along tether-cord TC—to a ground-based connection facility GBCF connected in circuit with more-or-less regular electric utility power lines and telephone utility telephone lines. Also shown in FIG. 15 is person P standing on the ground next to an office building OB holding dual-function hand-piece DFHP1. In a pseudo-cross-sectional manner, office OF (from FIG. 10) is shown to exist within office building OB.

Figure 16:
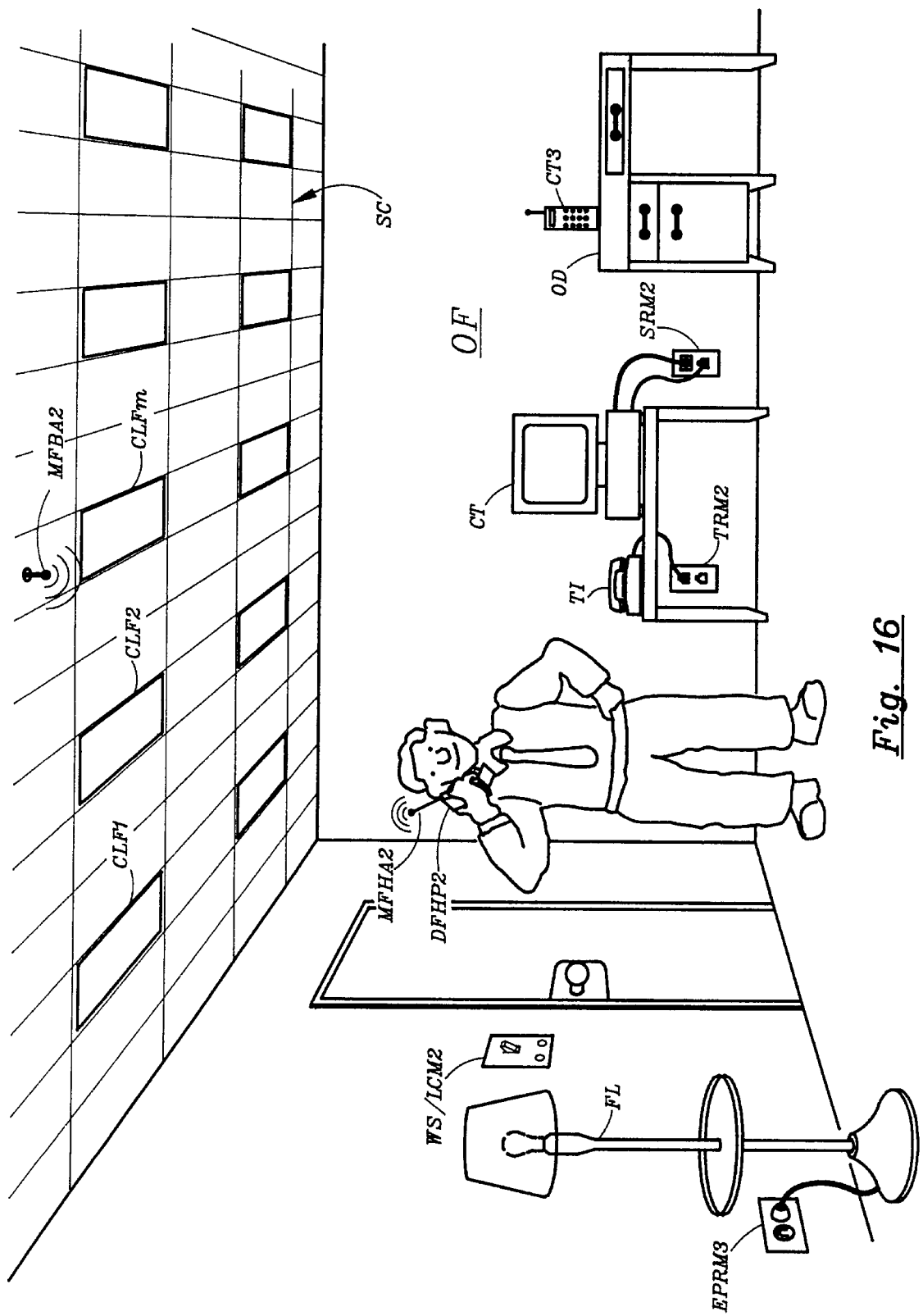
FIG. 16 illustrates an arrangement wherein a dual-function cordless hand-piece is combined with an intra-office micro-cellular telephone system.

FIG. 16 shows person P holding a dual-function hand-piece DFHP2 having a multi-function hand-piece antenna MFHA2; which hand-piece DFHP2 is connected in a wireless manner with multi-function base-antenna MFBA2 positioned in suspended ceiling SC.

Figure 17:
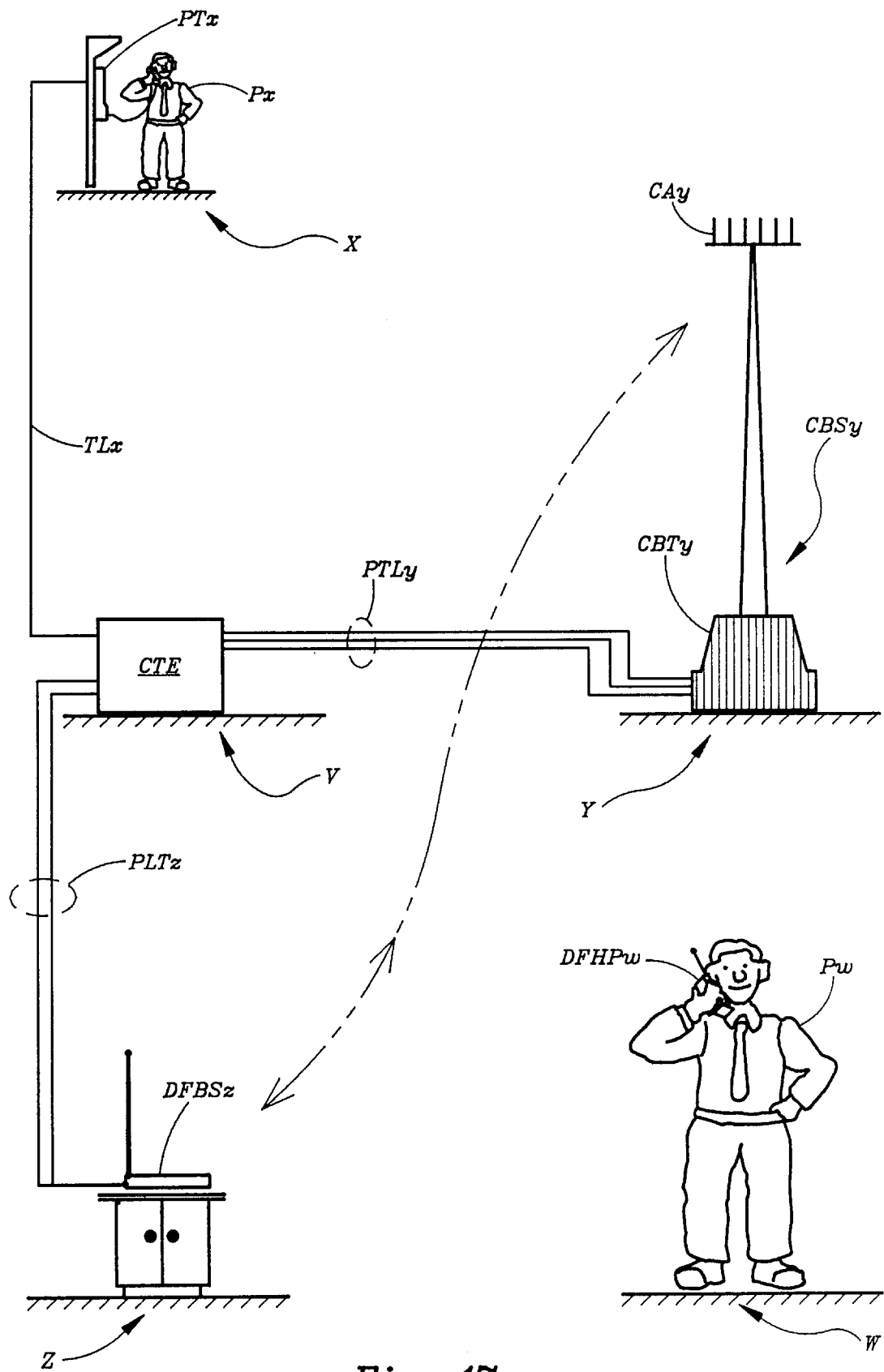
FIG. 17 provides an overview of a fourth system related to the present invention; which fourth system in an embodiment of the overall combined cordless-cellular telephone system.

FIG. 17 illustrates a first location X at which a person Px is talking on a public telephone PTx connected by way of telephone line TLx to central telephone exchange CTE located at a second location V. A cellular base station CBSy, located at a location Y, has a cellular antenna CAy and includes a cellular base transceiver CBTy; which cellular base transceiver CBTy is connected by way of plural telephone lines PTLy with central telephone exchange CTE. A dual-function base-station DFBSz is located at a third location Z; which dual-function base-station DFBSz is connected with central telephone exchange CTE by way of plural telephone lines PTLz. A person Pw, located at a fourth location W, holds a dual-function hand-piece DFHPw.

Details of Operation

The operation of the preferred embodiment of the cordless-cellular telephone system illustrated by FIGS. 9 through 17 is explained as follows.

Dual-function base station DFBS1 and dual-function hand-piece DFHP1 of FIGS. 9 and 10 are further illustrated by way of FIGS. 11 and 12.

In the arrangement represented by FIGS. 11 and 12, dual-function hand-piece DFHP1 is seen positioned (or cradled) in a designated indented area (or section) of dual-function base-station DFBS1. When so cradled, inductive pick-up loop IPULhp (which is located in flip-stand HFShp, which is hinged to the main body of hand-piece DFHP1) couples inductively with inductive supply loop ISL1, thereby picking up high-frequency (e.g., 20–50 kHz) AC power from inverter-type power supply IPS1 and supplying this AC power to the input terminals of rectifying voltage conditioner RVChp. From its output terminals, voltage conditioner RVC1 charges rechargeable battery RBhp, whose DC battery voltage is used controllably for powering either or both of transceivers HPT1 and HPT2.

Control input/output terminals from each of transceivers HPT1 and HPT2 are connected with control interface-panel CIPhp, from which control interface-panel a person may, by manual input means (such as by depressing one or more of the various keys shown in FIG. 12) provide programmable instructions with respect to: (i) which transceiver is to be connected with the microphone and/or the earphone, (ii) which transceiver is to be activated for transmission and/or reception, (iii) what telephone number-code is to be transmitted, (iv) what conditions must prevail to cause operation to be automatically switched over from one transceiver to the other transceiver, (v) etc.

For reasons a clarity, and due to the fact that the details of their operations and connections are well known, hand-piece DFHP1 of FIG. 11 is shown without a microphone means and an earphone means; which two elements are indeed present in DFPH1 and controllably connectable (by way of control interface-panel CIPhp) with either or both of transceivers HPT1 and HPT2.

Transceivers HPT1 and HPT2 are both connected with multi-function hand-piece antenna MFHA1, and are so designed as to permit (e.g., by frequency separation and/or by time separation means) each transceiver to transmit and/or receive at the same time without causing disabling interference. Techniques for accomplishing such function are well known to persons possessing ordinary skill in the particular art pertinent hereto and need not be further explained here.

Thus, for instance: transceiver HPT1 may be transmitting on a frequency of (say) 50 MHz and receiving on a frequency of 55 MHz; while transceiver HPT2 may be transmitting on a frequency of (say) 900 MHz and receiving on a frequency of 910 MHz.

In ordinary cellular and cordless telephones, the transmitter and receiver of the transceiver built into each of these cellular and cordless telephones are each functional, respectively, to transmit and receive on several different individual channels; and so it is as well with each of the two transceivers in hand-piece DFHP1. That is, hand-piece DFHP1 is in reality an integrated combination of a cellular telephone and a cordless telephone, using a cellular-type (i.e., cellular-dedicated) transceiver (e.g., transceiver HPT1) to provide telephonic connection with a regular cellular telephone system and a cordless (i.e., cordless-dedicated) transceiver (e.g., transceiver HPT2) to provide telephonic connection with a cordless telephone base-station; which cordless base-station, in turn, provides for connection with an ordinary (i.e., non-wireless-type or non-cellular-type) telephone system (as well as, optionally or alternatively, with a cellular-type telephone system). Thus, in one functional mode, hand-piece DFHP1 may be properly characterized as the cordless (or wireless) equivalent of an ordinary (e.g., non-wireless-type) two-line telephone.

In overall operation, dual-function hand-piece DFHP1 functions as follows.

In its usual mode of operation, when hand-piece DFHP1 is positioned in its cradle on base station DFBS1: (i) its battery RBph is being charged, (ii) the receiver-part of each of transceivers HPT1 and HPT2 is turned ON and rendered functional to receive wireless telephonic signals, (iii) whenever a telephonic signal is indeed received by either transceiver, an audible signal is provided from the hand-piece so as to cause a person located nearby to become aware of the presence of an incoming telephonic message, and (iv) the presence of the high-frequency AC voltage at the output terminals of inductive pick-up loop IPULL is received by an input terminal of control interface-panel CIPhp and operative to cause the control interface-panel to enter a base operating mode commensurate with the fact that the hand-piece is resting in its base charging cradle CCbs.

When hand-piece DFHP1 is removed from its base charging cradle CCbs, the high-frequency AC voltage is likewise removed from the output terminals of inductive pick-up loop IPUL1, thereby causing the control interface panel CIP1 to exit its base operating mode and enter instead a cordless operating mode; which cordless operating mode is characterized by the hand-piece being removed from its base charging cradle while at the same time being in cordless connection with its base-station.

However, if the hand-piece were to be removed from its base charging cradle while at the same time a telephonic signal (whether of cellular-type or cordless-type) is being received by its antenna, it will not only enter its cordless mode, but it will also enter an in-use mode; which in-use mode is characterized by permitting a telephone conversation to be carried out (with the party originating the telephonic signal) without initiating further commands (such as pressing one of the keys of the control interface-panel). Of course, at the end of the conversation (to prepare for other telephone calls), a hang-up command has to be provided; which hang-up command may be provided: (i) by placing the hand-piece back into its base charging cradle, (ii) by closing flip-stand HFShp so as to cause it to lie flush with the main body of the hand-piece, or (iii) by keying-in an express hang-up command. (Thus, the provision of the high-frequency AC voltage at the output terminals of inductive pick-up loop IPUL1 serves as a hang-up command.)

In its cordless mode, depending upon commands having been provided to the control interface-panel, hand-piece DFHP1 may receive telephone calls either from the cellular telephone system or from its base-station. When receiving a telephonic signal (from either source) while existing in its cordless mode, a person can accept and receive such telephonic signal by executing one of three simple accept-call commands: (i) move flip-stand HFShp from a closed position (i.e., flush with the main body of the hand-piece) to an open position (i.e., at an angle of about 90 degrees or more with respect to the main body of the hand-piece); (ii) with the flip-stand in an open position, by pressing a certain key on the control interface-panel; or (iii) optionally, with the flip-stand in an open position, by moving (e.g., lightly shaking) the main body of the hand-piece while at the same time or shortly thereafter talking into the microphone Mph. (For sake of clarity, the inertial switch means required for sensing movement of the hand-piece is not expressly illustrated.)

While in use in its cordless mode, the receiver of the cordless-dedicated transceiver (e.g., HPT2) senses the strength of the wireless telephonic signal being received from the base-station and conveys a corresponding cordless strength signal to an input terminal means of the control interface-panel. If the cordless signal strength were to fall below a predetermined level and remain there for longer than a predetermined brief period of time, a corresponding warning signal will be provided to the user, thereby indicating to him the imminent possibility of loss of cordless telephonic signal.

On perceiving such warning signal, the user may—by executing a certain cellular-directed command (e.g., by depressing a certain key on the control interface-panel, thereby initiating a pre-programmed transfer procedure)— initiate a transfer of his on-going cordless-mode telephone coversation (which is being conveyed by a first one of the two telephone lines by which the base-station is connected with the telephone utility company) to a cellular-mode telephone conversation. The hand-piece will effectuate such transfer by causing the transmitter in the cordless-dedicated transceiver in the hand-piece to transmit a predetermined transfer-code signal to the base-station. On receipt of this transfer-code signal, the base-station connects with the second of said two telephone lines (thereby effectively connecting the two telephone lines together at the base-station) and dials thereinto the hand-piece's cellular telephone number. Thus, as a result of this automatic dialing of the hand-piece's cellular telephone number, said second telephone line will (by way of the cellular telephone system) connect with the receiver of the cellular-dedicated transceiver in the hand-piece; which, upon receiving the resulting cellular telephonic signal, will automatically change from cordless-mode to cellular-mode, thereby enabling the user (in a substantially seamless non-interrupted manner) to continue his conversation by way of the cellular telephone system.

That is, if a person were to be carrying on a cordless-mode conversation by way of hand-piece DFHP1, and if he were to move away from the base-station far enough to cause the signal-strength of the cordless signals to diminish below a certain level (thereby indicating possible loss of telephonic connection), he ma—by pressing a "transfer-to-cellular" key—cause his telephonic connection to be transferred (by action of the base-station) from cordless-mode to cellular-mode; which, as seen from one perspective, means that his direct (cordless) connection with his base-station has been converted to an indirect connection with his base-station—with the indirect connection to the base-station being effectuated by way of a cellular telephone system and the base-station's second telephone line.

Alternatively, the function served by the base-station's second telephone line can instead be served with the cellular telephone function built into the base-station; which cellular telephone function is effectuated by one of the base-station's two transceivers BST1 and BST2.

Otherwise, with reference to FIG. 11, the operation of dual-function base-station DFBS1 may be explained as follows.

Both transceivers BST1 and BST2 are connected with, as well as powered from, the DC input/output terminals of rechargeable battery RBbs; which DC input/output terminals are also connected with the DC output terminals of voltage conditioner VCbs, whose AC power input terminals are (as long as multi-conductor connect cord MCCC1 is indeed plugged into the base-station's male multi-prong receptacle) connected with a source of AC power line voltage. Also connected with, as well as powered from, the DC input/output terminals is inverter-type power supply IPS1; from which high-frequency (i.e., 20–50 kHz) output current is supplied to inductive supply loop ISL1.

Thus, high-frequency current supplied from inverter-type power supply IPS1 excites (by way of magnetic field coupling) inductive supply loop ISL1, thereby permitting inductive pick-up loop IPULL in the flip-stand of the hand-piece to absorb high-frequency power from inductive supply loop ISL1 whenever the hand-piece is resting in its base-station's charging cradle (CCbs) as indicated in FIG. 11.

As long as multi-conductor connect cord MCCC1 does indeed function to connect the base-station with a source of AC power line voltage (or other AC or DC voltage), unidirectional current is provided from voltage-conditioner VCbs, thereby charging battery RBbs while also supplying the DC power drawn by inverter-type power supply IPS1 as well as by transceivers BST1 and BST2.

Of base-station transceivers BST1 and BST2: a first one (e.g., BST1) is dedicated to cellular-mode service; a second one (e.g., BST2) is dedicated to cordless-mode service. The cordless-dedicated transceiver (BST2) is connected with each of two telephone lines (via connect-cord MCCC1) as well as with the cellular-dedicated transceiver (BST1).

More particularly—by virtue of including programmable and/or automatic channel-switching means, automatic dialing means, signal-strength-sensing means, automatic transmitting and transponding means, etc.—the base-station cordless-dedicated transceiver (BST2) is far more than a mere transceiver. For instance, in addition to more-or-less conventional transmitting and receiving functions, the base-station cordless-dedicated transceiver (BST2) can (by being provided with appropriate instructions from the hand-piece) cause: (i) a first one (or, alternatively, a second one) of the two telephone lines (from MCCC1) to be connected with the base-station cellular-dedicated transceiver (BSC1); (ii) the cellular telephone number of hand-piece DFHP1 to be automatically dialed into the first (or, alternatively, second) telephone line; (iii) at certain times, a first special signal to be transmitted to the hand-piece, which first special signal is functional to indicate the strength of the signal being received by the base-station from the hand-piece; (iv) at certain other times (i.e., when not otherwise transmitting), periodically to transmit a second special signal, which second special signal is functional to be received by the hand-piece when not in use and to permit the hand-piece to respond in a transponder-like (or echo-like) manner; (v) sensing of the presence or non-presence of any such echo-like response from the hand-piece; (vi) in the absence of an appropriate echo-like response from the hand-piece, an incoming telephone call from either of the two telephone lines to be transferred to the cellular-dedicated base-station transceiver (BST1); (vii) via this transceiver BST1, automatic dialing into the cellular telephone system of the cellular telephone number of the hand-piece, thereby to effectuate telephonic connection with the hand-piece even when the hand-piece is outside of its usual cordless operating range; (vi) etc.

In effect, as long as connected with connect-cord MCCC1, base-station DFBS1 may be considered as a three-line telephone instrument—with one of the three lines being a wireless cellular line and two of the three lines being ordinary hard-wire telephone lines.

By virtue of including rechargeable battery RBbs, base-station DFBS1 can function even if the AC (or DC) power normally supplied via connect-cord MCCC1 is removed. Also, by virtue of including cellular-dedicated transceiver BST1, base-station DFBS1 can function as a cordless base-station even when fully disconnected from its connect-cord MCCC1; which is to say, as illustrated by FIG. 14, base-station DFBS1 can serve as a fully portable base-station for hand-piece DFHP1, thereby permitting hand-piece DFHP1 to be used as a cordless telephone within its normal cordless operating range (with respect to base-station DFBS1), provided of course that base-station DFBS1 is located within the service area of a applicably functioning cellular telephone system. In other words, the arrangement illustrated by FIG. 14 constitutes a two-stage cordless (or wireless) telephone system, with a first wireless stage existing between the hand-piece and the base-station and a second wireless stage existing between the base-station and the cellular telephone system's cell antenna covering the area within which the base-station is located.

Further Comments re Combined Cordless-Cellular Telephone System (aa) In the combined cordless-cellular telephone system illustrated by FIGS. 9 through 17, all the different functional blocks and/or sub-systems therein identified may readily be procured and/or constructed by a person possessing ordinary skill in the art pertinent hereto. More particularly, such a person would readily be able to completely construct and/or implement the herein disclosed combined cordless-cellular telephone system on basis of the various functional features herein specified and/or described for that system.

(ab) As stated somewhat differently than hereinabove, instant combined cordless-cellular telephone system— especially as represented by the base-station and hand-piece of FIGS. 11 and 12—will provide for the following functional features.

1. In day-to-day use, a person will typically have base-station DFBS1 standing on his desk with hand-piece DFHP1 resting in its charging cradle CCbs. When a telephone call comes in via one of the two telephone lines, an appropriate signal will be provided from the hand-piece; and the person may then remove the hand-piece from its charging cradle and—without any further actions or commands—use it for conversation as he would the hand set of any ordinary cord-connected telephone instrument. Thus, after completing his conversation, the person would simply place the hand-piece back into its charging cradle, which action will automatically cause the base-station to disconnect from the particular telephone line via which the conversation took place.

2. Instead of "hanging up" by returning the hand-piece to its base-station charging cradle, the "hanging-up" may instead be accomplished: (i) by the action of closing flip-stand HFShp; (ii) by pressing a special "hang-up" key (e.g., CK8 of FIG. 12); (iii) by placing the hand-piece into some other charging cradle, such as ACC1 of FIG. 10; or (iv) with the flip-stand closed, by momentarily orienting the hand-piece in a substantially vertical position (or, alternatively, by briefly shaking it up and down).

3. When removed from its charging cradle, the hand-piece may stand on a desk or table, resting on its flip-stand, or it may be carried in a pocket (or lie on a table) with the flip-stand in a closed position. Then, when a call comes in—whether via the cellular-dedicated transceiver or the cordless-dedicated transceiver—a person may "pick up the phone" and initiate a conversation either by moving the flip-stand toward an open position, or simply by briefly shaking the hand-piece followed shortly thereafter with talking into the microphone (Mhp of FIG. 12). However, it is not necessary to open the flip-stand in order to respond to an incoming telephone call; while, of course, to place a telephone call it would be necessary to open the flip-stand so as to get access to the programming keys.

In this connection, it is noted that arrangements have been made for microphone Mhp not to be covered by the flip-stand when it is closed.

4. In its cordless operating mode, hand-piece DFHP1 may be commanded (by way of pushing one or more keys on its control interface-panel) to have either or both of its receivers activated. With the receivers of both the cellular-dedicated and the cordless-dedicated transceivers (e.g., HPT1 and HPT2, respectively) activated, telephonic calls may be made (i.e., received and/or placed) by way of either a cellular telephone system or the base-station. Thus, hand-piece DFHP1 is in reality a portable two-line telephone instrument having: (i) one of its two lines wirelessly routed to dedicated base-station DFBS1 (and therefrom to either a regular hard-wire telephone line or wirelessly to a first cellular telephone system); and (ii) the other one of its two lines wirelessly routed to and via a second cellular telephone system. In fact, as long as the hand-piece's base-station has hard-wire connection with two ordinary telephone lines in addition to wireless connection with a cellular telephone system, and since the hand-piece is operable to place and/or receive telephone calls via any of the three telephonic lines connected to/with the base-station, the hand-piece (as long as positioned within cordless range of its base-station) may actually be characterized as being a four-line telephone instrument.

5. Of course, without making provisions to the contrary, when beyond the cordless range of its base-station, hand-piece DFHP1 becomes a single-line telephone instrument instead of a four-line telephone instrument.

However, provisions are made whereby—in response to pressing a predetermined set of keys on the control interface-panel— the usually cordless-dedicated transceiver (HPT1) will convert so as to function as a cellular-mode transceiver; which therefore (optionally and controllably) makes hand-piece DFHP1 a two-line telephone instrument even when moved outside of its usual cordless range.

Thus, by virtue of incorporating the feature of cellular/cordless convertibility into one of its transceivers (e.g, HPT1), hand-piece DFHP1 becomes in fact a portable telephone instrument that is controllably convertible between being a cordless telephone instrument and being a cellular telephone instrument.

6. As indicated by FIG. 13, hand-piece DFHP1 may be removed from its base-station charging cradle—such as when a person leaves his office for his trip home at the end of the day—and used as an ordinary cellular telephone instrument.

For purposes of illustration, if the person were to be carrying on a telephone conversation via hand-piece DFHP1 at the time of leaving his office, he could continue that conversation as he moves away from his desk and out of cordless range. As soon as one of the cordless signal strengths (i.e., either the strength of the signal received by the base-station or the strength of the signal received by the hand-piece) were to diminish below a predetermined level, his conversation would—provided had previously keyed-in instructions on the hand-piece's control interface-panel to such effect—automatically be transferred to the cellular telephone system. Thus, he could continue his conversation in a substantially uninterrupted manner: (i) as he leaves his office, automatically shifting from cordless-mode operation to cellular-mode operation, and (ii) subsequently, as he again approaches an appropriate base-station (e.g., in his home), automatically shifting back again to cordless-mode operation, all in a substantially seamless manner.

7. The cellular-dedicated transceiver (HPT1) of hand-piece DFHP1 has a certain cellular telephone number, as does the cellular-dedicated transceiver (BST1) of base-station DFBS1; which two telephone numbers may be different from one another. However, since a person would not normally need to use the base-station cellular telephone means and the hand-piece cellular telephone means at the same time, it is—at least in certain circumstances—preferable that the two telephone numbers be the same.

8. Otherwise, various other uses and/or applications of hand-piece DFHP1 and/or base-station DFBS1 are illustrated in a mostly self-explanatory manner in and by FIGS. 9–10 and 15–17.

FIG. 15 illustrates a situation wherein base-station DFBS1 is supported by a tethered earostat AS, thereby providing for an extra large operating range. Clearly, by provising for a plurality of spaced-apart tethered earostats, each carrying a base-station similar to DFBS1 except for having capacity for handling (i.e., transmitting and/or receiving) a plurality of wireless telephonic channels, a "poor man's" cellular telephone system will result. In this connection, it is noted that a tethered earostat may be kept afloat at altitudes as high as 15,000 feet for months at a time without requiring maintenance.

(Of course, rather than hanging outside underneath the aerostat, the base-station would in reality be housed within a special section of the earostat—typically in a protective "bubble" underneath its main body.)

In other words, a multi-channel wireless base-station in an aerostat would be substantially similar to that associated with antenna RAT2 of the (micro-cellular) office telephone system illustrated by FIG. 7 and indicated by office OF as being present within office building OB of FIG. 15; which situation is further illustrated by FIG. 16, which shows a person using a hand-piece DFHP2 for wireless communication with multi-function antenna MFBA2 mounted in suspended ceiling SC of office OF.

FIG. 17 provides an overall block/system diagram of instant combination cordless-cellular telephone system as well as an overview of an expectedly typical usage situation associated with a base-station such as DFBS1 (in this case identified as DFBSz) and a hand-piece such as DFHP1 (in this case identified as DFHPw).

(ac) In base-station DFBS1, transceiver DST2 serves a function additional to that of being a transceiver: it also serves the function of a telephone line switcher in that (depending on commands having been provided from hand-piece DFHP1) it may cause one of the two hard-wire telephone lines to be connected directly to the other of the two hard-wire telephone lines, or it may cause one of these two telephone lines to be connected to transceiver HPT1.

(ad) For sake of clarity, several necessary component parts of hand-piece DFHP1 are not expressly shown in FIG. 11. For instance, a microphone and an earphone are definitely required but are not shown in FIG. 11 (although they are indicated in FIG. 12 as Mph and EPhp, respectively). Moreover (and inter alia), electrically actuatable switching means are required for appropriately switching the microphone and earphone to and/or from transceivers HPT1 and HPT2, etc.

These several necessary not-expressly-illustrated component parts are interconnected with the component parts actually illustrated in manners well known and, since they and their specific means for interconnection form no inventive part of instant disclosure, need no further explanation.

(ae) An important feature of instant invention relates to using hand-piece DFHP1 as a transponder to base-station DFBS1, and—under certain circumstances—vice versa. Thus, even when no cordless telephonic communication occurs between the hand-piece and the base-station, the base-station emits periodic wireless signals. More particularly, when not being used for conveying a cordless telephone conversation, the cordless-dedicated transceiver in the base-station (BST2) emits periodic inquiry signals intended for its associated hand-piece and then "listens" for a response from that hand-piece. Under conditions when the it receives no such response, the base-station will re-route a telephone call coming in on one of the two (hard-wire) telephone lines by automatically dialing the hand-piece's cordless telephone number into the other of the two (hard-wire) telephone lines; thereby effectuating connection of the incoming telephone call to the hand-piece.

(af) The level of transmitting power of an integral portable cellular telephone (i.e., a cellular telephone where the transmitting antenna may quite often be located relatively close to a person's head) is limited to a relatively low level (e.g., about 0.5 Watt). Otherwise, the transmitting power may permissibly be substantially higher (e.g., about 5.0 Watt). The same or similar limitations pertain to cordless telephones as well.

Thus, maximum permissible transmission power of hand-piece DFHP1 would be only about 0.5 Watt, while maximum permissible transmission power of base-station DFBS1 would be about 5.0 Watt.

Nevertheless, to minimize possible hazard associated with exposure to electromagnetic fields (as well as to provide for an added degree of protection from electronic eavesdropping), the level of transmitting power emitted from antenna MFHA1 is reduced to levels below the maximum permissible under conditions where adequate quality communication can be effectuated at such reduced power levels. In fact, in the preferred embodiment, the levels of transmitting power from the hand-piece's antenna as well as from the base-station's antenna are each controlled to be no higher than that necessary to attain adequate clarity of communication.

To effectuate such mutual control of levels of transmitting powers: (i) the hand-piece monitors the signal strength of the wireless signal received from the base-station and transmits information to that effect back to the base-station; and (ii) likewise, the base-station monitors the signal strength of the wireless signal received from the hand-piece and transmits information to that effect back to the hand-set. Thus, by way of methods well known and without disturbing the telephonic communication between the two, the hand-piece and the base-station each receives a signal effective to provide a measure of the strength of the signal transmitted by it but as received by the other, thereby permitting its level of transmitted power automatically to be adjusted such as to maintain this measure of signal strength at a desirable level.

In other words, by providing each other with information regarding strength of signal received, the base-station and the hand-piece each automatically adjusts its level of transmission power to be only as high as necessary for adequate clarity of telephonic communication. Thus, when using the hand-piece and base-station in the manner of an ordinary cord-type telephone, only miniscule levels of power would be transmitted and hazards related to exposure to electromagnetic radiation, as well as opportunities for electronic eavesdropping, would be greatly diminished. On the other hand, when using the hand-piece at greater distances from the base-station, transmitting powers would automatically be increased as needed to maintain clarity in telephonic communication, but not higher than certain pre-determined levels.

In cellular applications, by providing for the cellular base-station to monitor the strength of the signal received from a cellular telephone (e.g., DFHP1) and to transmit information to that effect back to the cellular telephone, the level of transmitting power of the cellular telephone can similarly be adjusted so as not to be higher than necessary.

(ag) Some of the possibly unconventional terms used in the disclosure of instant invention—and which might not be sufficiently clearly understood from the context—are defined as follows.

1. The term "hand-piece" refers to a portable entity including, among other things, a microphone, an earphone, keys for keying-in alpha-numeric instructions, an alpha-numeric display means, an electric battery, a programmable control and switching means, one or more antennas, one or more transceivers, etc.—or the functional equivalents thereof. In a more general sense, a hand-piece is a portable cordless and/or cellular telephone instrument useful for placing and/or receiving telephone calls by wireless means.

2. The term "base-station" refers to an entity or arrangement including, among other things, an electric battery, a programmable control and switching means, one or more antennas, one or more transceivers, means by which to connect with one or more telephone lines of a public utility telephone company, etc.—or the equivalents thereof. A base-station may be portable (as is base-station DFBS1) or permanently installed (as is usually the case with a cellular base-station). In a more general sense, a base-station is a telephone instrument functional to connect with a public telephone system as well as with a portable cordless and/or cellular telephone instrument.

3. The term "hard-wired telephone line" refers to a connection with a telephone line of a telephone system (such as an ordinary public telephone system) that is effectuated by means other than wireless means. Thus, a hard-wired telephone line would define a telephone line that is connected by way of a physical or material signal conduit, such as a glass fibre or a pair of electrical wires.

4. The term "telephonic" refers to: (i) having telephone-like or telephone-related functions and/or features; or (ii) being characterized by and/or related to telephone or telephone-related products, entities, functions, actions, etc.

5. The term "cordless range" refers to the maximum distance (as measured from a base-station) over which a telephone conversation can effectively be carried out between a hand-piece and this base-station.

The cordless range depends on the level of power transmitted from the base-station's transmitter-antenna-combination, the level of power transmitted from the hand-piece's transmitter-antenna-combination, the effective sensitivities of the receiver-antenna-combinations of the base-station and the hand-piece, the mutual orientation of the antennas, the effects of intervening and/or surrounding structures, etc. In any case, the effective cordless range is highly dependent upon the level of power transmitted from the base-station and/or the hand-piece: the lower the level of power, the shorter the effective cordless range. Other things being roughly equal, the cordless range would be approximately proportional to the one-third power (i.e., the third root) of the level of transmitted power; which means that—if the maximum useful range were to be (say) 200 feet on basis of maximum permissible power levels (i.e., about 0.5 Watt and 5.0 Watt for the hand-piece and the base-station, respectively)—for a range of (say) only 20 feet (i.e., as in case of ordinary desk-bound telephone usage), the level of transmitted power would not need to be higher than about one thousandth of the level required for a cordless range of about 200 feet. Thus, for ordinary day-to-day desk-bound telephone usage, a cordless telephone system—such as that represented by the base-station and the hand-piece of FIG. 11—need only to have the base-station transmitting about 5.0 milli-Watt of power and the hand-piece transmitting about 0.5 milli-Watt of power.

6. The term "cellular range" refers to the maximum distance (as measured from a cellular base station) over which two-way telephonic transmission can effectively be carried out between a cellular telephone instrument and its cellular base-station.

7. The term "wireless" refers to conveying signals by means other than mechanically tangible conduits, such as glass fibres or electric conductors. That is, wireless transmission means focused or broadcasted transmission of telephonic signals through space.

8. The term "public utility telephone system" refers to a telephone system operative to interconnect, and/or facilitate the transmission of, telephonic calls from and/or to points accessible to the public.

9. The term "wireless telephone instrument" refers to a cordless telephone instrument and/or a cellular telephone instrument.

10. The term "seamless" refers to a function involved in a change of mode, state, condition, operation, etc. where this change occurs smoothly and substantially without interruption of function.

11. The terms "cellular telephone system" and "micro-cellular telephone system" refer, respectively, to (a) a public telephone system accessible via a wireless telephone instrument; and (b) an arrangement such as that illustrated by FIGS. 4A, 4B and 7 of instant application, which arrangement is approximately identical to an ordinary cellular telephone system, except for: (i) having substantially smaller operating range per cell (typically limited to a single room within a building; and (ii) not being a public telephone system.

12. The term "portable wireless telephone instrument" refers to a telephone instrument suitable for being held and handled by a single individual and via which, without requiring physical (i.e., hard-wired) connection with a hard-wired telephone line nor with an external source of power, telephone calls may be effectuated. Thus, by inherent necessity, a portable wireless telephone instrument must include wireless receiver means as well as a wireless transmitting means, which means must respectively include a receiving antenna means and a transmitting antenna means.

13. The term "portable base-station" refers to an entity suitable for being held and handled by a single individual and via which, without requiring physical (i.e., hard-wired) connection with a hard-wired telephone line nor with an external source of power, telephonic connections may be effectuated. Thus, by inherent necessity a portable base-station must include a dual-function wireless receiver means as well as a dual-function wireless transmitting means, which means must respectively include a dual-function receiving antenna means and a dual-function transmitting antenna means—where a dual-function wireless transmitting means refers to a transmitting means operable to transmit two independent telephonic signals at the same time, and a dual-function receiving means refers to a receiving means operable to receive two independent telephonic signals at the same time.

(ah) In the cordless telephone system illustrated by FIG. 11, it is reiterated that: (i) telephone conversations can be received and carried out by the hand-piece, totally without opening its flip-stand; (ii) the level of power transmitted by the hand-piece's antenna is controlled (via internal feedback in the transceivers) so as to be no higher than necessary to cause acceptable telephonic communication with its (cordless or cellular) base station; (iii) the base-station is portable and may be used as a cordless base-station anywhere within the range of a cellular telephone system; (iv) when moved beyond cordless range of its base-station, the hand-piece automatically switches from a cordless mode to a cellular mode, thereby to continue to constitute a totally portable wireless telephone instrument; and (v) if the hand-piece were to be moved beyond its cordless range while being used for a conversation, the wireless telephonic connection from the hand-piece would automatically be transferred from its cordless base-station to the appropriate cellular base-station, thereby permitting the conversation to be continued in a substantially uninterrupted seamless manner.

DESCRIPTION OF COMBINATION TELEPHONE AND SMOKE ALARM SYSTEM

Details of Construction

Figure 18:
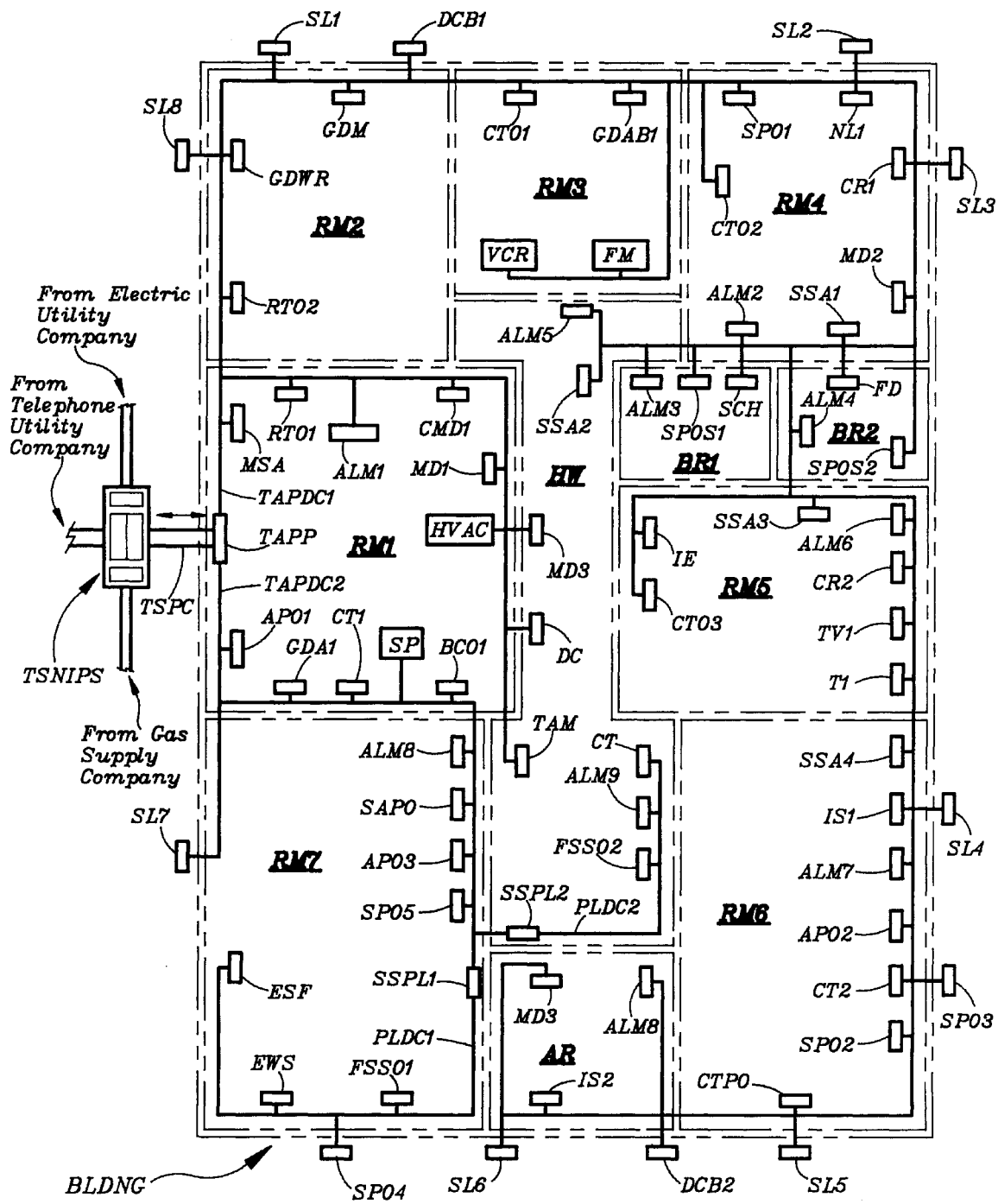
FIG. 18 schematically illustrates the preferred embodiment of the present invention.

FIG. 18 schematically illustrates the combination telephone and smoke alarm system.

In FIG. 18, a telephone signal and non-interruptible power source TSNIPS (details of which are provided in connection with FIG. 19) is shown as being connected with the power line voltage of an electric utility company, with the telephone lines of a telephone utility company, with the gas supply line of a gas supply company, and—by way of a combination telephone signal and power cable TSPC—with a telephone and alternative power panel TAPP in a building BLDNG.

Within this building, plural telephone and alternative power distribution cables TAPDC1 and TAPDC2 (details of which cables are provided in connection with FIG. 20) are connected with telephone and alternative power panel TAPP as well as with a plurality of various loads, outlets, enunciators, actuators, sensors, etc. disposed at spaced-apart points along these distribution cables.

More particularly, in a first room RM1 in the building, distribution cable TAPDC1 connects with: a master smoke alarm MSA, a regular telephone outlet RTO1, an alternative lighting means ALM1, a carbon monoxide detector CMD1, a motion detector MD1, and a heating, ventilation and air conditioning means HVAC; while in the same first room RM1, distribution cable TAPDC2 connects with: an alternative power outlet APO1, a garage door actuator GDA1, a computer terminal CT1, a sump pump SP, and a battery charging output BCO1. For details relative to how the various items are connected with their associated cables, reference is made to explanations related to FIG. 20.

Otherwise, cable TAPDC1 further extends to and/or into:

(a) a second room RM2 wherein it connects with: a regular telephone outlet RTO2, a garage door wireless receiver GDWR, and a garage door motor GDM;

(b) a third room RM3 wherein it connects with: a cordless telephone outlet CTO1, a garage door actuator button GDAB1, a fax machine FM, and a video cassette recorder VCR;

(c) a fourth room RM4 wherein it connects with: a cordless telephone outlet CTO2, a safe (i.e., Class-2) power outlet SPO1, a night light NL1, a clock radio CR1, a motion detector MD2, a slave smoke alarm SSA1, and an alternative lighting means ALM2;

(d) a first bath room BR1 wherein it connects with: a safe power outlet strip SPOS1, an alternative lighting means ALM3, and a shaver charger/holder SCH;

(e) a second bathroom BR2 wherein it connects with: a safe power outlet strip SPOS2, a flood detector FD, and an alternative lighting means ALM4;

(f) a hallway HW wherein it connects with: a slave smoke alarm SSA2, an alternative lighting means ALM5, a motion detector MD3, a telephone answering machine TAM, and a door chime DC;

(g) a fifth room RM5 wherein it connects with: a slave smoke alarm SSA3, an alternative lighting means ALM6, a clock radio CR2, a TV set TV1, an intrusion enunciator IE, a cordless telephone outlet CTO3, and a thermostat T1;

(h) a sixth room RM6 wherein it connects with: a slave smoke alarm SSA4, an intrusion sensor IS1, an alternative lighting means ALM7, a safe power outlet SPO2, an alternative power outlet APO2; a computer terminal CT2, and a fire-safe Christmas tree power outlet CTPO;

(i) an ante room AR wherein it connects with: an alternative lighting means ALM8, a motion detector MD3, and an intrusion sensor IS2;

(j) outside building BLDNG where it connects with: safety lights SL1 through SL8, door chime buttons DCB1 & DCB2, safe power outlets SPO3 & SPO4, and timer-controlled decorative lighting systems TCDLS1 & TCDLS2; while cable TAPDC2 further extends into:

(k) a seventh room RM7 wherein it connects with: an alternative lighting means ALM8, a small appliance power outlet SAPO, an alternative power outlet APO3, a safe power outlet SPO5, and a sub-station power limiter SSPL1, whose output connects with a power-limited distribution cable PLDC1 connected with a fire-and-shock-safe outlet FSSO1, an electronic weather station EWS, an electrostatic filter ESF; and (1) hallway HW wherein it connects with a sub-station power limiter SSPL2, whose output connects with a power-limited distribution cable PLDC2 which, in turn, is connected with a fire-and-shock-safe outlet FSSO2, an alternative lighting means ALM9, and a cellular telephone CT.

Figure 19:
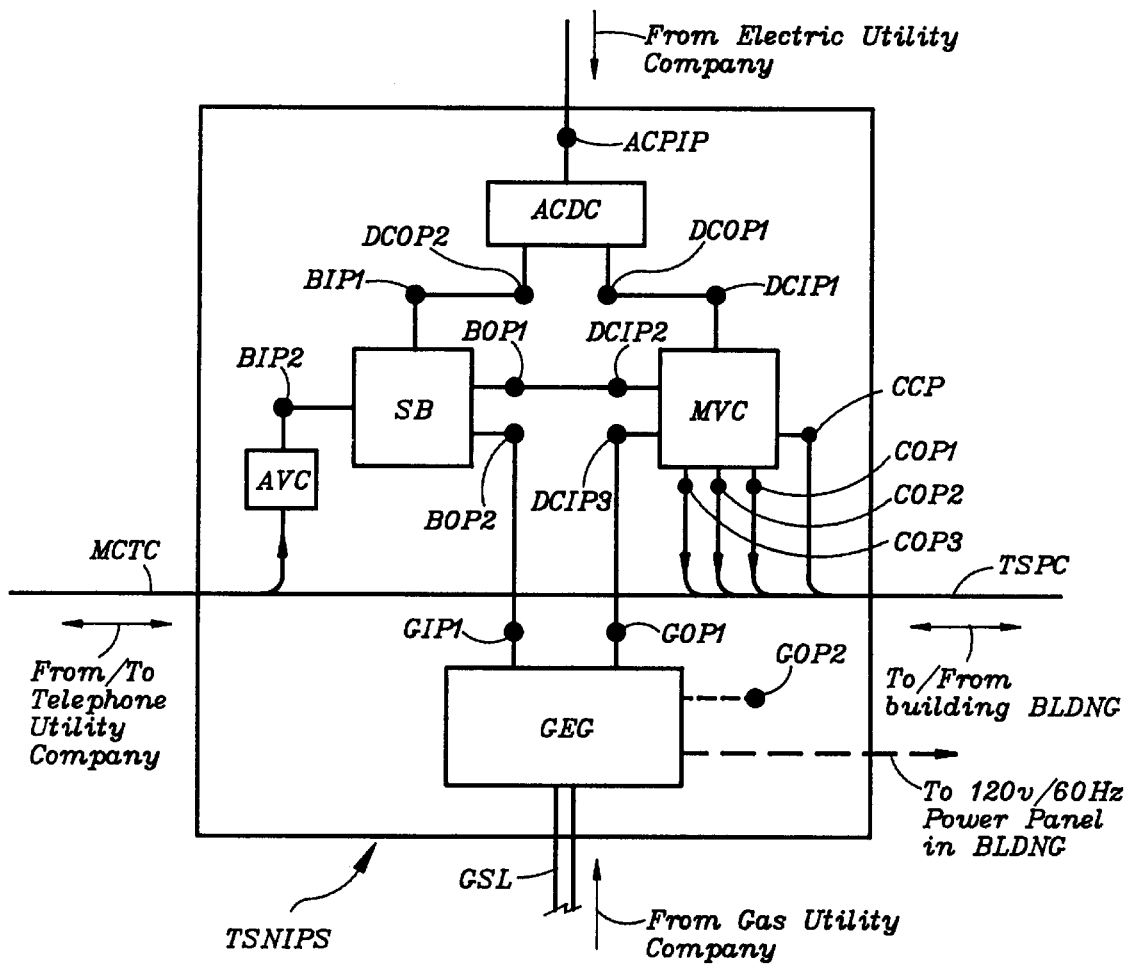
FIG. 19 schematically illustrates a first modification of the preferred embodiment.

FIG. 19 schematically illustrates the telephone signal and non-interruptible power source TSNIPS of FIG. 18.

In FIG. 19, regular power line voltage (e.g., 120Volt/60 Hz) is supplied from the local Electric Utility Company to an AC power input port ACPIP of an AC-to-DC converter ACDC located within power source TSNIPS. The AC-to-DC converter has a first DC output port DCOP1 connected with a first DC input port DCIP1 of a main voltage conditioner MVC, as well as a second DC output port DCOP2 connected with a first battery input port BIP1 of a storage battery SB; which storage battery has a first battery output port BOP1 connected with a second DC input port DCIP2 of main voltage conditioner MVC.

A multi-conductor telephone cable MCTC is connected between a Telephone Utility Company and telephone signal and non-interruptible power source TSNIPS. Within TSNIPS, conductors of cable MCTC are connected with a second battery input port BIP2 of storage battery SB by way of an auxiliary voltage conditioner AVC.

A gas supply line GSL from a Gas Utility Company is connected with a gas-driven engine-generator GEG, whose main output is provided at a generator output port GOP1, which is connected with a third DC input port DCIP3 of main voltage conditioner MVC. Engine-generator GEG also has a DC input port GIP1, which is connected with a second battery output port BOP2.

Main voltage conditioner MVC has: (i) a first conditioner output port COP1, (ii) a second conditioner output port COP2, and (iii) a third conditioner output port COP3.

Out of telephone signal and non-interruptible power source TSNIPS comes a combination telephone signal and power cable TSPC, which extends into building BLDNG of FIG. 18. The output ports (COP1, COP2, COP3) of main voltage conditioner MVC are connected into this cable TSPC.

Main voltage conditioner also has a conditioner control port CCP, which is connected into cable TSPC.

Figure 20:
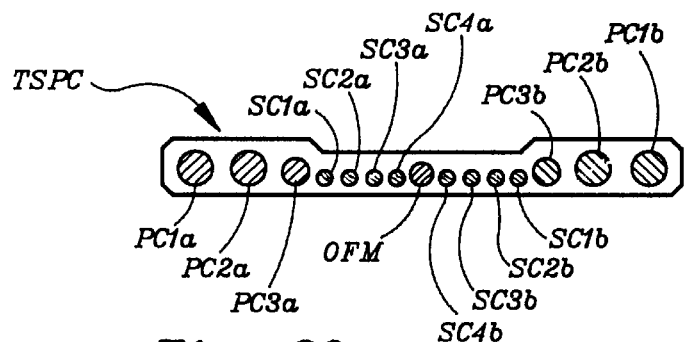
FIG. 20 schematically illustrates a second modification of the preferred embodiment.

FIG. 20 provides a cross-sectional view of telephone signal and power cable TSPC of FIG. 19; which cable rSPc extends between building BLDNG and telephone signal and non-interruptible power source TSNIPS of FIG. 18.

In FIG. 20, cable TSPC includes: (i) power conductor pairs PC1a/PC1b, PC2a/PC2b & PC3a/PC3b; (ii) signal conductor pairs SC1a/SC1b, SC2a/SC2b, SC3a/SC3b & SC4a/SC4b; and (iii) optical fiber means OFM.

Figure 21:
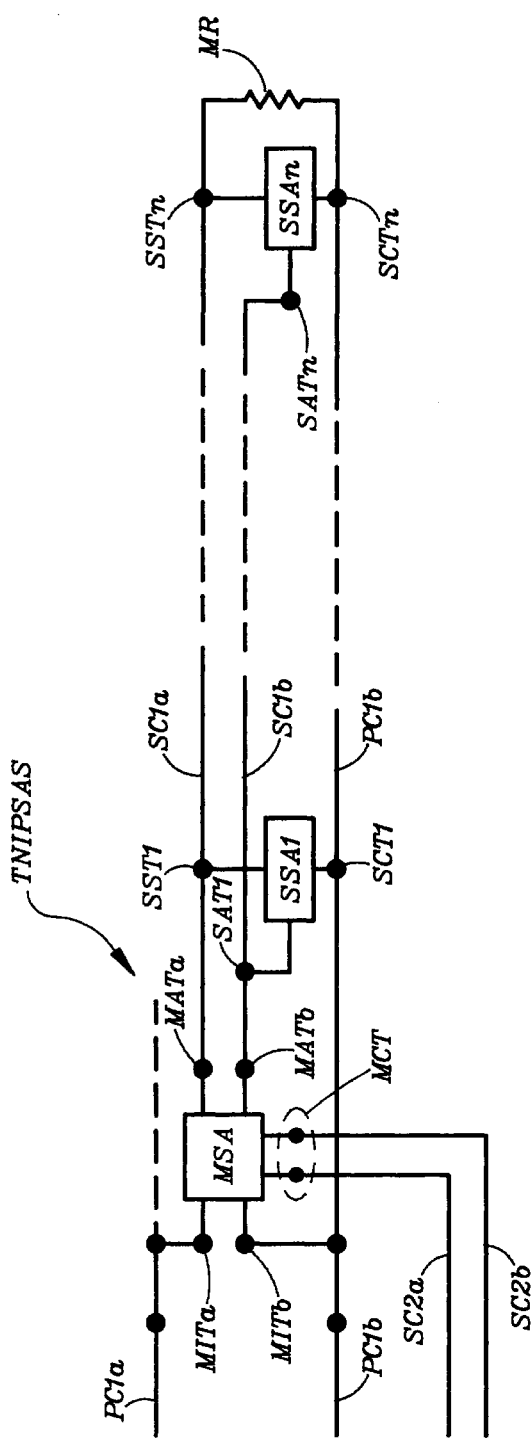
FIG. 21 schematically illustrates a key sub-system of the present invention.

FIG. 21 schematically illustrates a key sub-system of the overall telephone and non-interruptible power distribution system of FIG. 18; which key sub-system is referred to as telephone, non-interruptible power and smoke alarm system TNIPSAS.

With reference to FIGS. 18 and 20, in FIG. 21 master smoke alarm MSA (which has a pair of master input terminals MITa and MITb) is connected with cable TAPDC1 (which includes direct extensions of all the conductor pairs as well as the optical fiber means of cable TSPC) such that master input terminals MITa and MITb are connected with power conductors PCla and PClb, respectively. Master smoke alarm MSA also has: (i) a pair of master auxiliary terminals MATa and MATb, which are connected with signal conductors SC1a and SC1b, respectively; and (ii) a pair of master control terminals MCT connected with signal conductor pair SC2a/SC2b.

A first slave smoke alarm SSA1 has: (i) a slave common terminal SCT1 connected with power conductor PC1b; (ii) a slave supply terminal SST1 connected with signal terminal SC1a; and (iii) a slave activation terminal SAT1 connected with signal conductor SC1b.

Likewise, an nth slave smoke alarm SSAn has: (i) a slave common terminal SCTn connected with power conductor PC1b; (ii) a slave supply terminal SSTn connected with signal terminal SC1a; and (iii) a slave activation terminal SATn connected with signal conductor SC1b.

At the far side of smoke alarm SSAn (as referenced to master smoke alarm MSA) a monitor resistor MR is connected directly between power conductor PC1b and signal conductor SC1a.

Figure 22:
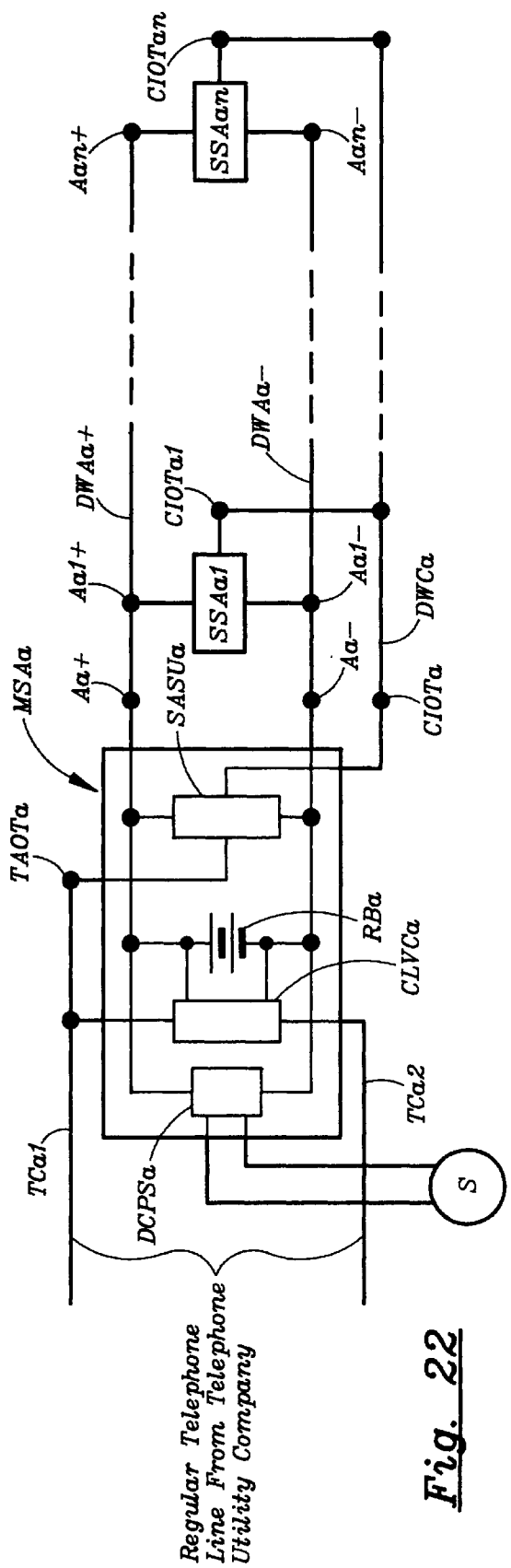
FIG. 22 schematically illustrates a modified version of the sub-system of FIG. 21.

FIG. 22 schematically illustrates a modified and more self-sufficient version of the combined telephone and smoke alarm sub-system of FIG. 21.

In FIG. 22, instead of being powered from the non-interruptible power source within the telephone signal and non-interruptible power source (TSNIPS) of FIG. 19, a master smoke alarm MSAa is powered directly from the DC voltage available from a pair of telephone conductors TCa1 and TCa2 coming from the local telephone company; which DC voltage is applied to a built-in rechargeable battery RBa by way of a current-limiting voltage conditioner CLVCa. Battery RBa is connected with an Aa– terminal and an Aa+ terminal as well as with a smoke alarm sub-unit SASUa disposed within master smoke alarm MSAa. Smoke alarm sub-unit SASUa has a control input/output connected with control input/output terminal CIOTa of master smoke alarm MSAa and a telephone alarm output connected with a telephone alarm output terminal TAOTa; which telephone alarm output terminal TAOTa is connected with telephone conductor TCa1.

Connected with terminals Aa–, Aa+ and CIOTa of master smoke alarm MSAa are distribution wires DWAa–, DWAa+ and DWCa, respectively; which distribution wires respectively connect with terminals Aa1–, Aa1+ and CIOTa1 of a slave smoke alarm SSAa1, as well as with terminals Aan–, Aan+ and CIOTan of a slave smoke alarm SSAan.

As an adjunct (or alternative) to powering the master smoke alarm (MSAa) from the telephone line (i.e., via telephone conductors TCa1/TCa2), the master smoke alarm is also powered by way of a small built-in AC-powered Class-2-type DC power supply DCPSa; which power supply DCPSa has its AC input terminals connected with the AC power line voltage of an ordinary electric utility power source S and has its DC output terminals connected across the terminals of rechargeable battery RBa.

Details of Operation

In a highly extrapolated manner, the combination telephone and smoke alarm system is illustrated by way of the telephone and non-interruptable alternative power supply system of FIG. 18.

In the arrangement of FIG. 18, AC power lines from the local electric utility company, telephone lines from the local telephone utility company, and a gas line from the local gas utility company are all routed to the telephone signal and non-interruptible power source (TSNIPS), from which emerges telephone signal and power cable TSPC; which cable is brought to telephone and alternative power panel TAAP within building BLDNG.

The operation of telephone signal and non-interruptible alternative power source TSNIPS is best explained with reference to the arrangement of FIG. 19.

In FIG. 19, cable MCTC includes several separate conductors, including one or more pairs of telephone signal conductors. One particular pair of conductors within cable MCTC provides a DC voltage suitable for charging storage battery SB by way of auxiliary voltage conditioner AVC; one main function of which is that of permitting storage battery SB to be charged from the DC voltage on this particular pair of conductors without being over-charged.

AC power input port ACPIP of AC-to-DC converter ACDC draws current from the power line coming from the Electric Utility Company with a high (preferably at least 95%) power factor and provides, from its DC power output port DCPO2, a carefully controlled charging current to storage battery SB, thereby to prevent battery overcharging.

Thus, battery SB is being charged from the electric utility power line as well as from the telephone line, thereby providing for battery charging (at least to a modest degree) even in case of interruption of power from the electric utility power line.

First battery output port BOP1 of storage battery SB provides a DC voltage to first DC input port DCIP1 of main voltage conditioner MVC; which voltage conditioner modifies (i.e., conditions) this DC input voltage so as to provide three different outputs: (i) a first output being a DC voltage of 120 Volt magnitude, provided at conditioner output port COP1; (ii) a second output being a substantially sinusoidal AC voltage of 120 Volt RMS magnitude and 60 Hz frequency, provided at conditioner output port COP2; and (iii) a third output being a DC voltage of 12 Volt magnitude, provided at conditioner output port COP3.

With reference to FIG. 20, the three separate outputs from conditioner output ports COP1, COP2 and COP3 are connected, respectively, with conductor pairs PC1$a$/PC1$b$, PC2$a$/PC2$b$ and PC3$a$/PC3$b$ of cable TSPC.

However, except in case of failure on part of the Electric Utility Company to supply AC power line voltage, substantially all the DC power required by main voltage conditioner MVC is actually drawn by its DC input port DCIPl and delivered from DC output port DCOP1 of AC-to-DC converter ACDC. Thus, storage battery SB supplies DC power from its battery output port BOP1 only during times when the Electric Utility Company fails to supply AC power line voltage to the AC-to-DC converter.

Still with reference to FIG. 20, conditioner control port CCP—which is connected with signal conductor pair SC1$a$/SC1$b$ of cable TSPC—supplies a brief (e.g., 10–100 microsecond long) voltage pulse once every $\frac{1}{120}$th second (i.e., once every half-cycle of the 60 Hz AC voltage provided at conditioner output port COP2); which voltage pulse is transmitted along signal conductor pair SC2$a$/SC2$b$ of cable TSPC as well as along corresponding conductor pairs in telephone and alternative power distribution cables TAPDC1 and TAPDC2 in building BLDNG.

The function of the periodic brief voltage pulses is that of permitting corresponding periodic brief disconnections of all the loads connected with those particular conductors in cables TAPDC1 & TAPDC2 which are connected with conductor pairs PC1$a$/PC1$b$ & PC2$a$/PC2$b$ of cable TSPC.

Thus, for instance, all the loads connected with those particular conductors in cable TAPDC1 that are connected with power conductor pair PC1$a$/PC1$b$ of cable TSPC, are also connected with the particular conductors in cable TAPDC1 that are connected with signal conductor pair SC2$a$/SC2$b$. Thus, each load supplied from cable TAPDC1 with 120 Volt DC voltage (e.g., alternative lighting means ALM1 of FIG. 18) is also supplied with said periodic brief voltage pulses, thereby—by way of an electronic switch means (such as a field effect transistor)—permitting the flow of current to load ALM1 to be periodically interrupted for 10–100 micro-seconds 120 times per second.

Thus, with all the loads connected with conditioner output port COP1 (via conductor pair PC1$a$/PCa2) synchronously disconnected for a brief (e.g., 10–100 micro-second) period each $\frac{1}{120}$th second, the flow of current from output port COP1 is correspondingly interrupted each $\frac{1}{120}$th second; which is to say: in the absence of a fault condition, during each such brief period, the magnitude of any current flowing from output port COP should be zero. However, if the magnitude of any current flowing during each such brief period were to be different from zero, it would indicate a fault, such as a partial short circuit.

In particular, if the magnitude of any current flowing during each such brief period were to exceed a certain predetermined level, an unacceptable fault condition would be known to exist; and main voltage conditioner MVC would then cause the 120 Volt DC output voltage to be removed from output port COP1 for some given period, such as 20 seconds. After this 20 second period, the output voltage would be restored, but would—after but a short duration (e.g., 0.05 to 5.0 seconds, depending on degree of fault)—again be removed for 20 seconds if the fault condition were to continue to exist.

In other words, in the combination telephone and smoke alarm system of FIG. 18, each load effectively connected with power conductor pairs PC1$a$/PC1$b$ & PC2$a$/PC2$b$ (i.e., via cables TAPDC1 and TAPDC2) is so connected by way of a "normally closed" electronic switch means (e.g., an ON-biased field effect transistor) that—with help of the periodic brief voltage pulses provided from the CCP terminal of main voltage conditioner MVC—is switched OFF once each $\frac{1}{120}$th second for a brief period (e.g., 10–100 micro-seconds). Main voltage conditioner MVC is so constituted as: (i) to sense the absolute magnitude of any current flowing from its output port COP1 (and/or COP2) during each of these brief periods; and (ii) in case that absolute magnitude were to exceed some predetermined level for longer than a short duration (e.g., 0.05 to 5.0 seconds, depending on the degree by which the absolute magnitude were to exceed this predetermined level) to remove the 120 Volt DC output voltage from that port for a period of about 20 seconds. Thereafter, the 120 Volt DC output voltage would be re-instated, only to be removed again in case the predetermined magnitude level were to continue to be exceeded.

With the indicated predetermined current magnitude level set such as to correspond to an output power of 100 Watt, (i.e., 0.833 Amp at a 120 Volt DC output voltage) output port COP1 and all the cabling attached thereto would constitute a Class-3 (i.e., fire-initiation-safe) electric circuit.

In the telephone and smoke alarm system of FIG. 18, a multitude of different loads (including various types of telephone-type instruments) are shown to be connected with distribution cables TAPDC1 & TAPDC2. Of these, the several smoke alarms (MSA and SSA1–SSA4) will be described in further detail.

The operation of the smoke alarm system represented by master smoke alarm MSA and slave smoke alarms SSA1–SSA4 may be readily understood with reference to the arrangement of FIG. 21.

In FIG. 21, master smoke alarm MSA is connected with the 120 Volt DC voltage provided from power conductors PCa1/PCa2 via distribution cable TAPDC1. This master smoke alarm includes a voltage conditioning means (not expressly shown in FIG. 21, but shown in FIG. 22) operative to cause total disconnection from power conductors PC1a/PC1b in correspondence with the voltage pulses provided from signal conductors SC2a/SC2b. Also, this voltage conditioning means provides for a relatively low-magnitude DC voltage (e.g., 9 Volt) to be provided between power conductor PC1b and signal conductor SC1a, thereby to provide such low-magnitude DC voltage to slave smoke alarms SSA1–SSAn.

Being powered by a low-magnitude (e.g., 9 Volt) DC voltage from conductors PC1b and SC1a, each slave smoke alarm (e.g. SSA1) operates as a smoke alarm in a conventional manner, as does master smoke alarm MSA as well. However, if any given one of the various smoke alarms were to detect smoke sufficient for it to activate its siren, then it would also cause a substantial change in the magnitude of a DC voltage present between signal conductors SC1b and SC1a; which change of magnitude would initiate the sirens in each of the other smoke alarms. That is, if but one of the smoke alarms were to detect smoke so as to cause it to activate its siren, then it would also cause all the other smoke alarms to activate their sirens.

In yet other words, upon detecting smoke, any one of the various smoke alarms will cause the magnitude of the DC voltage present between conductors SC1a and SC1b to change, and if the change in the magnitude of this DC voltage is greater than a predetermined amount, the sirens in the various smoke alarms will start to sound off; and they will cease to sound off only after the change in the magnitude of the DC voltage has diminished to a point lower than said predetermined amount.

The function of monitor resistor MR in the arrangement of FIG. 21 is that of permitting master smoke alarm MSA to monitor the integrity of conductors PC1c and SC1a; which monitoring is accomplished by sensing the magnitude of the current flowing from terminal MATa under quiescent (i.e., no alarm) conditions. Then, if this magnitude be lower than some predetermined amount (as principally determined by the resistance of resistor MR), then the siren within master smoke alarm MSA will emit a distinct sound.

The smoke alarm system of FIG. 22 is similar to that of FIG. 21 except that, instead of being powered from the 120 Volt DC voltage from power conductors PC1a/PC1b, it is powered from the relatively modest amount of current obtainable from a regular pair of telephone conductors; which modest amount of current is used for maintaining rechargeable battery RB in a state of being fully charged.

Thus, in case of an actual smoke alarm condition, power for the sirens in the several smoke alarms is provided from rechargeable battery RB; which battery has sufficient energy stored to provide all the power required by the sirens under an actual smoke alarm condition—that is, sufficient to provide for the sirens to sound for the required minimum length of time (e.g., four minutes).

Alternatively (or additionally), master smoke alarm MSAa of the smoke alarm system of FIG. 22 is connected with electric utility power source S, therefrom—via Class-2 power supply DCPSa—to have not only enough power to keep battery RBa fully charged, but also enough to deliver all the power needed for a smoke alarm condition.

With master smoke alarm MSAa connected with power line source S as indicated, and with this power line source representing a reliable source of power, there is in fact no need to include rechargeable battery RBa. The only reason to include rechargeable battery RBa would be that of providing for the rare situations where a smoke alarm condition were to occur during a power failure.

Further Comments re Combined Telephone and Smoke Alarm System (ba) The magnitude of the open-circuit DC voltage available from an ordinary telephone line is about 48 Volt. The internal resistance associated with this open-circuit voltage is typically 600 Ohm; in which case it would be possible to charge a 9 Volt battery (the most common battery supply voltage in a smoke alarm) with a current of about 65 milli-Amp, which amounts to a power level of 585 milli-Watt: enough by itself to power several smoke alarms under a smoke alarm condition. Thus, when being connected with telephone conductors TCa1/TCa2, it would seem unnecessary to include rechargeable battery RBa in the arrangement of FIG. 22. However, there is apt to be a great deal of variation in the effective internal resistance associated with the DC voltage available from an ordinary telephone line, especially during periods when the telephone line is in actual use for telephone purposes; and to provide for the degree of reliability usually required with a smoke alarm system, a backup battery would seem to constitute a reasonable proposition.

(bb) With reference to the arrangement of FIG. 22, and recognizing that the magnitude of the DC voltage available from the telephone line is about 48 Volt (with a 600 Ohm internal resistance), when powering a smoke alarm system from the telephone line, a maximum amount of power would be available for the smoke alarm system if the system were made to function properly with a DC supply voltage of 24 Volt magnitude instead of the usual 9 Volt.

However, when powered both from the telephone lines (TCa1/TCa2) and from the power line (S), the backup battery (RBa) can safely be eliminated.

(bc) In one version of the smoke alarm system of FIG. 22, it is arranged for a special telephone ringing signal to be provided on the telephone line in case of an actual fire alarm condition. That way, all the telephone instruments connected with this particular telephone line will sound the fire alarm by way of a special ringing signal.

(bd) In the arrangement of FIG. 18, the profusion of different loads connected with the combination telephone signal and non-interruptible power supply (TSNIPS) is meant to illustrate the high degree of flexibility and utility associated with such a system.

However, for ease of installation and maximum utility, it is important that the power source (TSNIPS) and its associated power distribution cables (TAPDC1, TAPDC2) be acceptable as safe from fire-initiation hazard; which, with reference to the terminology used by Underwriters Laboratories, by National Fire Protection Association, and in the National Electrical Code, means that the power source (TSNIPS) and its associated distribution cables (TIAPDC1, TAPDC2) must come within the specifications for Class-2 or Class-3 electrical circuits; which, inter alia, means that the maximum amount of power available from the power source and its associated distribution cables must not exceed 100 Watt on a continuous basis.

Such is indeed the case with respect to power source TSNIPS and its distribution cables TAPDC1 & TAPDC2. That is, except if a load is specifically authorized by proper code means to draw power from power source TSNIPS (or from cable TAPDC1 or cable TAPDC2), no more than 100 Watt of power will be provided from output ports COP1, COP2 and/or COP3 of source TSNIPS and therefore not from anywhere along cable TAPDC1 and/or TAPDC2.

Yet, provided a load is authorized by proper code means, there is no particular limit to the amount of power it may draw from power source TSNIPS via cables TAPDC1 or TAPDC2.

All the loads connected with output ports COP1, COP2 and/or COP3 via distribution cables TAPDC1 and/or YAPDC2 are indeed authorized by proper code means. More particularly, in instant case, proper code means refers to the fact that each load connected with power conductors PC1$a$/PC1$b$, PC2$a$/PC2$b$ and/or PC3$a$/PC3$b$ is so connected via a switch means that provides for complete disconnection of the load for a brief period (e.g., 10–100 micro-seconds) once each $\frac{1}{120}$th second at given synchronous moments in time. Thus, by having main voltage conditioner MVC shut down in case the sum total of any power flowing from its output ports during those brief periods were to exceed 100 Watt, power conductors PC1$a$/PC1$b$, PC2$a$/PC2$b$ & PC3$a$/PC3$b$ may be considered as meeting Class-3 specifications as far as any load that reasonably might be considered to represent a fire-initiation hazard.

In other words, any potentially fire-initiation-hazardous load connected with distribution cables TAPDC1 or TAPDC2, and drawing more than 100 Watt therefrom, would (during said 10–100 micro-second periods) be recognized by main voltage conditioner MVC as representing an excessive unauthorized load and would cause voltage conditioner MVC to shut down for some predetermined duration (e.g., 10 seconds).

(be) In the arrangement of FIG. 18, each load (or group of loads) connected with power conductors PC1$a$/PC1$b$, PC2$a$/PC2$b$ and/or PC3$a$/PC3$b$ of distribution cables TAPDC1 or TAPDC2 includes a series-connected electronic switch means activated by the voltage pulses provided on signal conductors SC2$a$/SC2$b$ (which are connected with control port CCP of main voltage conditioner MVC). In the preferred embodiment, and as long as the voltage provided from the power conductors is a DC voltage, this series-connected electronic switch means is simply a field-effect transistor arranged to exist in a conductive mode except when provided with a voltage pulse at its gate terminal; which voltage pulse is provided from signal conductors SC2$a$/SC2$b$ for a period of 10–100 micro-seconds once every $\frac{1}{120}$th second.

Absent other control means, there is no particular limit on the amount of power that can be drawn by a load connected with any of power conductor pairs PC1$a$/PC1$b$, PC2$a$/PC2$b$ or PC3$a$/PC3$b$ downstream of the electronic switch means. Moreover, any load connected downstream of an electronic switch means becomes an authorized load.

In other words, absent other control means, any load or circuit connected downstream of its associated electronic switch means can not be treated as fire-initiation-safe, which means that such load or circuit must be treated as if it represents a fire initiation hazard.

Thus, absent other control means, any load or circuit connected downstream of its associated electronic switch means must be housed in a fire-initiation-safe enclosure.

Yet, even if it be necessary to enclose some or all of the loads in fire-initiation-safe enclosures, distribution cables TAPDC1 & TAPDC2 nevertheless may be treated as inherently fire-initiation-safe and therefore do not require to be placed within fire-initiation-safe enclosures (e.g., steel conduits).

(bf) In the arrangement of FIG. 18, most of the plural loads include built-in power limiting means. For instance, each of alternative lighting means ALM1 through ALM9 includes an electronic means functional to limit the maximum available power to a level under 100 Watt. Likewise, each of safe power outlet strips SPOS1 & SPOS2, safe power outlets SPO1 through SPO5, safety lights SL1 through SL8, Christmas tree power outlet CTPO, etc. includes an electronic means operative to limit maximum available power output to a level under 100 Watt.

On the other hand, some of the loads (such as sump pump SP and garage door motor GDM) do not include built-in power limiting means.

(bg) The basic operation of the non-interruptible power source illustrated by FIG. 19 is as follows:

1. The AC-to-DC converter (ACDC) is normally supplied with ordinary 120 Volt/60 Hz power line voltage and, when indeed so supplied, is functional to maintain storage battery SB at a proper fully-charged level.

2. The AC-to-DC converter is also operative to provide a constant-magnitude DC voltage to DC input port DCIP1 of main voltage conditioner MVC. The magnitude of this constant-magnitude DC voltage is only slightly higher than the magnitude of the battery voltage provided at battery output port BOP1. As long as the magnitude of the constant-magnitude DC voltage is higher than that of the battery voltage, all the power used by main voltage conditioner MVC is drawn from DC output port DCOP1.

3. In case the power line voltage were to be removed, no constant-magnitude DC voltage would be provided to DC input port DCIP1; and all the power required by main voltage conditioner MVC would now be drawn from battery output port BOP1.

4. Main voltage conditioner MVC is functional to convert the DC voltage received at either of its DC input ports DCIP1, DCIP2 and/or DCIP3 in such a way as to provide: (i) a constant-magnitude 120 Volt DC voltage at its first output port COP1; (ii) a substantially sinusoidal AC voltage of 120 Volt RMS magnitude at its second output port COP2; and (iii) a constant-magnitude 12 Volt DC voltage at its third output port COP3.

5. In case of a failure to supply 120Volt/60 Hz power line voltage to the AC-to-DC converter, the magnitude of the battery voltage would start to diminish gradually. If the magnitude of the battery voltage—as sensed by circuitry within gas engine generator GEG—were to fall below a predetermined level, the gas engine within gas engine generator GEG would automatically start with the help of a built-in starter motor powered by the DC voltage from battery output port BOP2, and gas engine generator GEG would thereafter start to deliver a constant-magnitude DC voltage to DC input port DCIP3 of main voltage conditioner MVC.

6. After restoration of the 120Volt/60 Hz power line voltage, charging of storage battery SB from DC output port DCOP2 would resume; and the magnitude of the battery voltage present at battery output port BOP2 would almost immediately increase to a substantially higher level; which substantially higher level: (i) would be conveyed to input terminal GIP1, (ii) would be sensed by circuitry within gas engine generator GEG, and (iii) would cause gas engine generator GEG to cease operation.

7. Shown in phantom outline in FIG. 19 is an optional feature whereby gas engine generator GEG has a second output port GOP2 connected with the regular 120Volt/60 Hz main power distribution panel (not shown) in building BLDNG of FIG. 18 and operative, at certain selected times and/or whenever the magnitude of the power line voltage provided from the Electric Utility Company falls below some predetermined level, to deliver 60 Hz current thereto. That way, other loads in building BLDNB may be properly powered even at times when no power is delivered from the Electric Utility Company; or, for instance, at other times, to minimize charges from the Electric Utility Company, 60 Hz current may be supplied from gas engine generator GEG such as to minimize peak demand charges.

(bh) With respect to each of the various power-drawing loads connected with distribution cables TAPDC1 or TAPDC2, the series-connected electronically controlled switch associated with each such load—instead of being arranged to be normally in a conductive state and to be rendered non-conductive on receipt of a voltage pulse from control port CCP of main voltage conditioner MVC—may be arranged to be normally in a non-conductive state and to be rendered conductive on receipt of a voltage pulse from control port CCP.

This latter arrangement may be advantageous in certain installations in that it allows for full central ON/OFF control of all the loads connected with power conductors PC1a/PC1b, PC2a/PC2b & PC3a/PC3b of distribution cables TAPDC1 & TAPDC2. Thus, in case of malfunction, all the power-drawing loads may be switched off from a central location, thereby to permit a more accurate determination of any system malfunction.

(bi) Telephone signal and non-interruptible power source TSNIPS of FIG. 18 would usually be located outside of, but within about 100 feet from, its associated building. However, in some cases it may advantageously be disposed within the building.

(bj) The smoke alarm system illustrated by FIG. 22 has applicability even if not combined with the non-interruptible power supply arrangement of FIG. 19.

Also, the smoke alarm system of FIG. 22 may be entirely disconnected from the telephone line; in which case it should be connected with the regular electric utility power line.

In FIG. 22, master smoke alarm MSAa may simply be a (Class-2-type) power supply suitable for powering the interconnected slave smoke alarms SSAa1 through SSAan; in which case smoke alarm sub-unit SASUa would be eliminated.

It is noted that DC power supply DCPSa provides for electric (i.e., so-called galvanic) isolation from the regular power line; which means that a person connected with a conductor of the power line will not be exposed to a hazardous electric shock if he were to touch one of the conductors in the smoke alarm system (i.e., conductors CIOTa, Aa– and/or Aa+).

(bk) A smoke alarm is defined as an entity that: (i) includes a smoke detector; (ii) includes a siren operative to emit an audible alarm; (iii) requires a low-magnitude DC voltage for proper operation; and (iv) may include a source of low-magnitude DC voltage.

A slave smoke alarm is defined as an entity that: (i) includes a smoke detector; (ii) includes a siren operative to emit an audible alarm; (iii) requires a low-magnitude DC voltage for proper operation; and (iv) does not include a source of low-magnitude DC voltage.

A master smoke alarm is defined as an entity that: (i) includes a smoke detector; (ii) includes a siren operative to emit an audible alarm; (iii) requires a DC voltage for proper operation; (iv) includes a source of DC voltage; (v) supplies shock-hazard-safe DC voltage to one or more slave smoke alarms; and (vi) may be connected with an external source of electric power, such as an electric utility power line.

A master smoke alarm power supply is defined as an entity that: (i) includes a source of DC voltage; (ii) supplies shock-hazard-safe DC voltage to one or more slave smoke alarms; and (iii) may be connected with an external source of electric power, such as an electric utility power line.

(bl) One (or more) of the telephone-type instruments connected with distribution cables TAPDC1 or TAPDC2 (see FIG. 18) is also connected with optical fiber means OFM (see FIG. 20) and receive and/or transmit telephone and/or data signals via this optical fiber means. At the same time, however, this telephone-type instrument is also connected with at least one of the pairs of power conductors PC1a/PC1b, PC2a/PC2b & PC3a/PC3b of distribution cables TAPDC1 and/or TAPDC2.

(bm) Not expressly shown in the diagram of FIG. 18 is the fact that the 120 Volt DC voltage applied to power conductors PC1a and PC1b is also, via a pair of current-limiting resistors, connected with signal conductors SC3a and SC3b, respectively. Then, at various remote locations along distribution cables TAPDC1 and TAPDC2, each of signal conductors SC3a and SC3b is connected with each of power conductors PC1a and PC1b, respectively, by way of a diode—with the diodes poled in such a way that a current will flow through a diode (and thereby through one of the current-limiting resistors) only if the absolute magnitude of the potential at a power conductor at one of the remote locations is lower than the absolute magnitude of the potential at the same power conductor at the source of the 120 Volt DC voltage.

Then, if there be an excessive voltage drop along one (or both) of power conductors PC1a and/or PC1b, such excessive voltage drop would be discerned from the magnitude of the corresponding voltage drop across one of the current-limiting resistors; which corresponding voltage drop would be sensed by a disable means built into main voltage conditioner MVC (see FIG. 19) and, if indeed excessive, would cause this disable means to remove (or diminish the magnitude of) the 120 Volt DC voltage.

More particularly: (i) while actually delivering power to its various authorized loads, the sensing of a first predetermined excessive voltage drop along power conductor(s) PC1a and/or PC1b will cause the 120 Volt DC voltage to be removed within a first relatively short period and to remain removed for a first relatively long period; and (ii) while not delivering power to its authorized loads (a situation that occurs for 10–100 micro-seconds once every $\frac{1}{120}$th second), a second predetermined excessive voltage drop along power conductor(s) PC1a and/or PC1b will cause the 120 Volt DC voltage to be removed within a second relatively short period and to remain removed for a second relatively long period.

Thus, main voltage conditioner MVC is specified to be, and characterized by being, operative to remove (or substantially diminish the magnitude of) the 120 Volt DC voltage provided at its output port COP1 under one or more of the following conditions: (i) if, for longer than a relatively short first period, more than a certain relatively small amount of power (e.g., 100 Watt) is being drawn during the OFF-periods of the various authorized loads (i.e., the 10 to 100 micro-second-long periods occurring once every $\frac{1}{120}$th second) for longer than a relatively short first period (e.g. 1 to 10 seconds); (ii) if more than a certain relatively large amount of power (e.g., 2500 Watt) is being drawn for longer than a relatively short period (e.g., 1 to 100 seconds); and (iii) if more than a certain relatively small voltage drop (e.g., 5 Volt) were to exist along one of the power conductors (e.g., PC1a) for longer than a certain relatively brief period of time.

(bn) Also not expressly shown in FIGS. 18 and 19 is the fact that the waste heat generated within telephone signal and non-interruptible power source TSNIPS is used in and/or for the building (BLDNG) for heating purposes.

More particularly, water circulated through a water cooling system (not expressly shown) for gas engine generator GEG will be used to help satisfy the hot water needs of the building. After the building's hot water needs have been satisfied, and to the degree waste heat still is available, the hot water from the GEG cooling system will be used for the building's space heating needs—either directly for immediate needs when appropriate, or indirectly in the form of heating a heat storage medium wherefrom future space heating needs will be met, anticipatedly by way of heat pumping.

(bo) When using telephone signal and non-interruptible power source TSNIPS illustrated by FIGS. 18 and 19 in such manner as to take advantage of the waste heat from gas engine generator GEG {as indicated in section (bn) above} it would be particularly appropos to locate the TSNIPS system inside the building (BLDNG). More particularly, it is anticipated that it be located in close proximity to the building's hot water tank/heater and/or its central HVAC system.

I claim:

1. An arrangement comprising:

a building occupied, at least at times, by human beings; the building having a first set of electrical terminals;

a source of electrical power located outside of the building; the source having a second set of electrical terminals;

a first set of conductors connected between the first set of electrical terminals and the second set of electrical terminals;

a master smoke alarm located within the building; the master smoke alarm having a set of master power input terminals connected with the second set of electrical terminals by way of a second set of conductors; the master smoke alarm being further characterized: (i) by having a set of master input/output terminals; (ii) by including a master siren operative to sound an alarm in the presence of smoke; and (iii) by including a master battery;

plural slave smoke alarms located within the building; each slave smoke alarm being further characterized: (i) by having a set of slave input/output terminals; (ii) by including a slave siren operative to sound an alarm in the presence of smoke; and (iii) by not including a battery; and a third set of conductors connecting each set of slave input/output terminals with each other set of slave input/output terminals as well as with the set of master input/output terminals.

2. The arrangement of claim 1 wherein the source of electrical power includes an electric power line from an electric utility company.

3. The arrangement of claim 1 wherein the source of electrical power is an electric power line from an electric utility company.

4. The arrangement of claim 1 wherein the source of electrical power includes an ordinary telephone line from a telephone utility company.

5. The arrangement of claim 1 wherein the source of electrical power is an ordinary telephone line from a telephone utility company.

6. The arrangement of claim 1 wherein the source of electrical power is incapable of providing sufficient power to properly power all the sirens.

7. The arrangement of claim 1 wherein the source of electrical power is incapable of providing sufficient power to properly power even one of the sirens.

8. The arrangement of claim 1 wherein the master battery is additionally characterized by being rechargeable.

9. The arrangement of claim 1 wherein: (i) the master battery is additionally characterized by being rechargeable; and (ii) the source of electrical power is incapable of properly powering all the smoke alarms, but is capable of properly recharging the master battery.

10. The arrangement of claim 1 wherein, in case only one of the smoke alarms were to be in the presence of smoke, all the sirens would sound alarm, with power for all the sirens being supplied by the master battery.

11. The arrangement of claim 1 wherein the source of electrical power is characterized by including a storage battery.

12. The arrangement of claim 1 wherein the storage battery is at times recharged by an engine-driven electric generator.

13. The arrangement of claim 1 wherein the source of electrical power is characterized by: (i) being connected with a public electric utility power line that is operative, most of the time, to supply electric power; and (ii) including an electric storage battery operative to supply electrical power at times when the public electric utility power line fails to do so.

14. The arrangement of claim 1 wherein the source of electrical power is characterized by: (i) being connected with a public telephone utility telephone line that is operative, most of the time, to supply a small amount of electric power; and (ii) including an electric storage battery operative to supply electrical power at times when the telephone line fails to do so.

15. The arrangement of claim 1 wherein the source of electrical power is characterized by: (i) being located within 100 feet of the building; (ii) being connected with the AC voltage of an ordinary electric utility power line; and (iii) including an AC-to-DC converter powered by the AC voltage and operative to provide a DC voltage between two of the second set of electrical terminals.

16. An arrangement comprising:

an AC power source providing an AC power line voltage at a pair of power line conductors;

a physical structure having a set of main electrical terminals; the physical structure including a building functional to be occupied by human beings; the main electrical terminals being connected with the power line conductors;

a distribution cable including a pair of distribution conductors; the pair of distribution conductors having a beginning and an end;

plural smart loads connected with the pair of distribution conductors at spaced-apart locations along the distribution cable; the plural smart loads including a smoke alarm; each of the smart loads being characterized by including an electronic circuit; and a smart voltage conditioner connected between the main electrical terminals and the beginning of the pair of distribution conductors; the smart voltage conditioner being operative, except when subjected to a certain type of loading condition, to cause a conditioned voltage of a given magnitude to exist across the pair of distribution conductors; said certain type of loading condition including a condition wherein an ordinary resistive load is connected directly across the pair of distribution conductors.

17. The arrangement of claim 16 further characterize in that the conditioned voltage is a DC voltage of substantially constant magnitude.

18. The arrangement of claim 16 further characterized in that: (i) the distribution cable also includes a second pair of distribution conductors; the second pair of distribution conductors being connected in circuit with a telephone line from a public telephone utility; and (ii) a telephone instrument is connected with the second pair of distribution conductors at spaced-apart locations along the distribution cable.

19. The arrangement of claim 16 further characterized in that the smart voltage conditioner includes means operative to prevent a person from receiving a hazardous electric shock if touching one of the distribution conductors, even if that person were to have electrical connection with one of the power line conductors.

20. The arrangement of claim 16 further characterized in that the smart voltage conditioner includes energy-storing means operative to cause the conditioned voltage to continue to exist across the pair of distribution conductors for a period of time even if the AC power source were to cease providing the AC power line voltage at the power line conductors; the duration of said period of time being longer than one minute.

21. The arrangement of claim 20 further characterized in that the substantive period of time is longer than 24 hours.

22. The arrangement of claim 16 further characterized in that the smart voltage conditioner includes an alternative source of electric power; which alternative source of electric power is independent of said AC power source.

23. The arrangement of claim 22 further characterized in that the alternative source of power includes an engine-driven generator; the engine-driven generator having an engine powered by gaseous fuel.

24. The arrangement of claim 23 further characterized in that the gaseous fuel is supplied from a public gas utility.

25. The arrangement of claim 16 further characterized in that: (i) the distribution cable includes a pair of signal distribution conductors connected in circuit with each smart load; and (ii) the smart voltage conditioner includes a pair of signal terminals connected with the signal distribution conductors and operative therethrough to provide a control signal operative to affect the function of each smart load.

26. The arrangement of claim 16 wherein each of said plural smart loads includes a signal-generating sub-circuit connected with the distributions conductors and operative to send a signal to the smart voltage conditioner, thereby to convey to the smart voltage conditioner information relating to the amount of power drawn by each of said plural smart loads.

27. An arrangement comprising:
an AC power source providing an AC power line voltage at a pair of power line conductors;
a physical structure having a set of main electrical power input terminals; the physical structure including a building adapted to be occupied by human beings; the main electrical power input terminals being connected with the power line conductors;
a distribution cable including a set of distribution conductors; the set of distribution conductors having a beginning and an end;
plural smart loads connected with the distribution conductors at spaced-apart locations along the distribution cable; each one of the smart loads being characterized by including an electronic circuit connected with the distribution conductors and operative to supply a signal thereto; the signal being indicative of the magnitude of the power drawn by said one of the smart loads; and
a smart voltage conditioner connected between the main electrical power input terminals and the beginning of the distribution conductors; the smart voltage conditioner being operative, except when subjected to a certain type of loading condition, to cause a conditioned voltage of a given magnitude to exist across a certain pair of the distribution conductors; said certain type of loading condition including a condition wherein an ordinary resistive load is connected directly across said certain pair of the distribution conductors.

28. The arrangement of claim 27 wherein at least one of the plural smart loads is a smoke alarm.

29. An arrangement comprising:
a building operative to be occupied by human beings; the building having a set of building electrical terminals;
a source of electrical power located outside of the building; the source having a set of source terminals;
a first set of conductors connected between the source terminals and the building electrical terminals;
a voltage-conditioning sub-system located within the building; the voltage-conditioning sub-system having a set of power input terminals connected with the building electrical terminals by way of a second set of conductors; the voltage-conditioning sub-system also having a set of voltage conditioner terminals;
plural smoke alarms located within the building; each smoke alarm having: (i) a set of smoke alarm terminals; and (ii) a smoke detection device and a siren operative, at times, to sound an alarm; and
a third set of conductors operative to cause each set of smoke alarm terminals to be connected with each other set of smoke alarm terminals as well as with the voltage conditioner terminals; the third set of conductors including a pair of conductors across which exists a DC voltage and between which a resistor is connected; the resistor drawing more current, during periods when no alarm is being emitted, than do all the smoke alarms in combination.

30. An arrangement comprising:
a building operative to be occupied by human beings; the building having a set of building electrical terminals;
a source of electrical power located outside of the building; the source having a set of source terminals;
a first set of conductors connected between the source terminals and the building electrical terminals;
a voltage-conditioning sub-system located within the building; the voltage-conditioning sub-system having a set of power input terminals connected with the building electrical terminals by way of a second set of conductors; the voltage-conditioning sub-system also having a set of voltage conditioner terminals;
plural smoke alarms located within the building; each smoke alarm having: (i) a set of smoke alarm terminals; and (ii) a smoke detection device and a siren operative, at times, to sound an alarm; and
a third set of conductors operative to cause each set of smoke alarm terminals to be connected with each other set of smoke alarm terminals as well as with the voltage conditioner terminals; the arrangement being further characterized in that the source of electrical power includes a pair of telephone lines from a public telephone utility.

* * * * *